(12) United States Patent
Esenlik et al.

(10) Patent No.: US 11,303,902 B2
(45) Date of Patent: Apr. 12, 2022

(54) LINE BUFFER FOR SPATIAL MOTION VECTOR PREDICTOR CANDIDATES

(71) Applicant: HUAWEI TECHNOLOGIES CO., LTD., Shenzhen (CN)

(72) Inventors: Semih Esenlik, Munich (DE); Anand Meher Kotra, Munich (DE); Zhijie Zhao, Munich (DE); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/074,635

(22) Filed: Oct. 20, 2020

(65) Prior Publication Data

US 2021/0058624 A1    Feb. 25, 2021

Related U.S. Application Data

(63) Continuation of application No. PCT/US2019/027797, filed on Apr. 17, 2019.
(Continued)

(51) Int. Cl.
*H04N 19/139* (2014.01)
*H04N 19/132* (2014.01)
(Continued)

(52) U.S. Cl.
CPC ......... *H04N 19/139* (2014.11); *H04N 19/132* (2014.11); *H04N 19/152* (2014.11);
(Continued)

(58) Field of Classification Search
CPC .. H04N 19/139; H04N 19/132; H04N 19/152; H04N 19/167; H04N 19/176; H04N 19/96
See application file for complete search history.

(56) References Cited

U.S. PATENT DOCUMENTS 10,602,180 B2    3/2020  Chen et al.
11,140,387 B2 *  10/2021 Lee ........................ H04N 19/11
(Continued)

FOREIGN PATENT DOCUMENTS

EP    2800370 A1    11/2014

OTHER PUBLICATIONS

HiSilicon Technologies Co., Ltd, Enhanced Merge Mode based on JEM7.0, JVET-J0059-v1, Joint Video Experts Team (JVET) of ITU-T SG 16 WP 3 and ISO/IEC JTC 1/SC 29/WG 11, 10th Meeting: San Diego, US, 10 Apr. 20, 2018, 14 pages.
(Continued)

*Primary Examiner* — Hesham K Abouzahra

(57) ABSTRACT

The present disclosure relates to apparatuses and methods for determination of motion parameters (e.g. motion vectors) for motion prediction of a coding block, and is applicable to video encoding and/or decoding. The motion parameter is selected from motion parameters, which include motion parameters associated with a set of respective image samples not included in the coding tree unit, where the set of image samples are located at a predetermined position relative to an extended boundary of the coding tree unit. The apparatuses and methods of the present disclosure may facilitate reducing on-chip buffer requirements for motion prediction.

20 Claims, 14 Drawing Sheets

Related U.S. Application Data

(60) Provisional application No. 62/660,599, filed on Apr. 20, 2018.

(51) Int. Cl.
  *H04N 19/152* (2014.01)
  *H04N 19/167* (2014.01)
  *H04N 19/176* (2014.01)
  *H04N 19/96* (2014.01)

(52) U.S. Cl.
  CPC ......... *H04N 19/167* (2014.11); *H04N 19/176* (2014.11); *H04N 19/96* (2014.11)

(56) References Cited

U.S. PATENT DOCUMENTS

| | | |
|---|---|---|
| 2012/0114043 A1 | 5/2012 | Lee et al. |
| 2013/0243093 A1 | 9/2013 | Chen et al. |
| 2014/0286431 A1 | 9/2014 | Lee et al. |
| 2016/0105685 A1 | 4/2016 | Zou et al. |
| 2016/0277749 A1 | 9/2016 | Lim et al. |
| 2020/0221116 A1* | 7/2020 | Chen ................ H04N 19/70 |

OTHER PUBLICATIONS

European Search Report for Application 19788544.5 dated Apr. 16, 2021, 13 pages.
Vivienne Sze et al. High Efficiency Video Coding (HEVC), Algorithms and Architectures, 2014. total 384 pages.
Yi-Wen Chen et al. Description of SDR, HDR and 360 video coding technology proposal by Qualcomm and Technicolor low and high complexity versions, Joint Video Exploration Team (JVET) of ITU-T SG 16 WP 3 and ISO/IEC JTC 1/SC 29/WG 11, JVET-J0021, 10th Meeting: San Diego, US, Apr. 10-20, 2018, total 47 pages.
ITUu-T H.265(Feb. 2018), Series H: Audiovisual and Multimedia Systems Infrastructure of audiovisual services—Coding of moving video, High efficiency video coding, Feb. 2018. total 692 pages.
ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

* cited by examiner

LINE BUFFER FOR SPATIAL MOTION VECTOR PREDICTOR CANDIDATES

CROSS-REFERENCES TO RELATED APPLICATIONS

This patent application is a continuation of International Application No. PCT/US2019/027797, filed on Apr. 17, 2019, which claims the priority of US provisional application No. 62/660,599, filed on Apr. 20, 2018. The disclosures of the aforementioned applications are hereby incorporated by reference in their entireties.

TECHNICAL FIELD

Embodiments of the present disclosure relate to the field of picture processing such as still picture and/or video picture encoding and decoding.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g. scalability and/or three-dimensional (3D) extensions, of these standards.

SUMMARY

Embodiments of the disclosure are defined by the features of the independent claims. Further advantageous implementations of the embodiments are defined by the features of the dependent claims.

According to an aspect, an apparatus is provided for determining a motion parameter for motion prediction of a current coding block included in a coding tree unit, the coding tree unit being included in a video frame comprising image samples, the apparatus comprising: a processing circuitry which, in operation: selects the motion parameter for the current coding block from a plurality of motion parameter candidates, the plurality of motion parameter candidates including a set of motion parameters associated with a set of respective image samples not included in the coding tree unit, the set of image samples being located at a predetermined position relative to an extended boundary of the coding tree unit.

An advantage of such approach is enabling the particular implementations to reduce buffer size of a fast buffer (such as on-chip memory) which is used to store the motion parameters to be used for candidate list construction for the current block. In particular, since the set of image samples is located at the predetermined position relative to an extended boundary of the coding tree unit, for any coding block of a coding three unit, the motion parameters of same set of image samples may be used and stored. Other motion parameters do not need to be stored which may result in lower requirements on the buffer size.

For example, the set of image samples is located in a first region formed within a predetermined distance from the extended boundary of the coding tree unit.

In one exemplary embodiment, the set of image samples is located within a plurality of first regions alternating with one or more second regions not comprising any image samples associated with the plurality of motion vector candidates and the first and the second regions being non-overlapping and located in different distances from the extended boundary of the coding tree unit.

In other words, the first region may be formed by one or more lines of samples neighboring the extended boundary of the coding tree unit.

In some embodiments, the plurality of motion parameter candidates does not include any motion parameters associated with image samples outside the first region(s).

For example, each motion parameter candidate is associated with a plurality of image samples pertaining to a coding block with a predetermined block size.

In particular, the first region is formed by one or more lines of coding blocks of the predetermined block size neighboring the extended boundary of the coding tree unit.

In some embodiments, each of the first regions is formed by a plurality of lines of samples parallel to the extended boundary of the coding tree unit, the plurality of lines corresponding to one or an integer multiple of the predetermined block size; and/or each of the second regions is formed by a plurality of lines of samples parallel to the extended boundary of the coding tree unit, the plurality of lines corresponding to one or an integer multiple of the predetermined block size.

For instance, the predetermined block size is being predefined.

For example, the extended boundary of the coding tree unit is a vertical boundary and/or horizontal boundary.

In some embodiments, the plurality of motion parameter candidates further includes a motion parameter associated with a sample located within the coding tree unit.

In some embodiments, the apparatus for determining a motion parameter further includes a buffer for storing said set of motion parameters associated with said set of respective image samples, wherein the processing circuitry in operation stores said set of motion parameters associated with said set of respective image samples into the buffer.

For instance, the apparatus for determining a motion parameter is embedded on an integrated circuit.

Further provided is an apparatus for encoding a video frame to generate a bitstream, the encoding apparatus comprising the apparatus for determining a motion parameter and a binarization unit for generating a bitstream including an indication of the determined motion parameter.

Also provided is an apparatus for decoding a video frame from a bitstream, the decoding apparatus comprising a parsing unit for extracting from the bitstream an indication of a motion parameter; the apparatus for determining a motion parameter, wherein the selection is performed based on the extracted indication.

In some embodiments, the bitstream further includes an indication of the predetermined position.

In some embodiments, the bitstream further includes an indicator indicating the predetermined block size.

For instance, the predetermined position is a distance N from the extended boundary of the coding tree unit and/or spacing of the first and second regions expressed in one of:

Number of samples, and

Number of coding blocks of the predetermined block size.

In some embodiments, the predetermined block size is a minimum size of coding block for which motion parameters are determinable.

According to another aspect, a method is provided for determining a motion parameter for motion prediction of a current coding block included in a coding tree unit, the coding tree unit being included in a video frame comprising image samples, the method comprising selecting the motion parameter for the current coding block from a plurality of motion parameter candidates, the plurality of motion parameter candidates including a set of motion parameters associated with a set of respective image samples not included in the coding tree unit, the set of image samples being located at a predetermined position relative to an extended boundary of the coding tree unit.

For instance, the set of image samples are located in a first region formed within a predetermined distance from the extended boundary of the coding tree unit.

In some embodiments, the set of image samples is located within a plurality of first regions alternating with one or more second regions not comprising any image samples associated with the plurality of motion vector candidates, the first and the second regions being non-overlapping and located in different distances from the extended boundary of the coding tree unit.

For instance, the first region is formed by one or more lines of samples neighboring the extended boundary of the coding tree unit.

For example, the plurality of motion parameter candidates does not include any motion parameters associated with image samples outside the first region(s).

In some embodiments, each motion parameter candidate is associated with a plurality of image samples pertaining to a coding block with a predetermined block size.

According to some embodiments, the first region is formed by one or more lines of coding blocks of the predetermined block size neighboring the extended boundary of the coding tree unit.

In some embodiments, each of the first regions is formed by a plurality of lines of samples parallel to the extended boundary of the coding tree unit, the plurality of lines corresponding to one or an integer multiple of the predetermined block size; and/or each of the second regions is formed by a plurality of lines of samples parallel to the extended boundary of the coding tree unit, the plurality of lines corresponding to one or an integer multiple of the predetermined block size.

For example, the predetermined block size is pre-defined.

In some embodiments, the extended boundary of the coding tree unit is a vertical boundary and/or horizontal boundary.

For example, the plurality of motion parameter candidates further includes a motion parameter associated with a sample located within the coding tree unit.

According to some embodiments, the method further includes storing, in a buffer, said set of motion parameters associated with said set of respective image samples.

Further, a method for encoding a video frame to generate a bitstream is provided, the method comprising determining a motion parameter according to the above method steps and generating a bitstream including an indication of the determined motion parameter.

Also provided is method for decoding a video frame from a bitstream, the method comprising: extracting from the bitstream an indication of a motion parameter; and determining a motion parameter according the above method steps, wherein the selection is performed based on the extracted indication.

For instance, the bitstream further includes an indication of the predetermined position.

In some embodiments, the bitstream further including an indicator indicating the predetermined block size.

In some embodiments, the predetermined position is a distance N from the extended boundary of the coding tree unit and/or spacing of the first and second regions expressed in one of:

Number of samples, and

Number of coding blocks of the predetermined block size.

For example, the predetermined block size is a minimum size of coding block for which motion parameters are determinable.

According to an embodiment, a non-transitory computer readable medium is provided storing program including instruction which, when executed on a processor, perform all steps of the methods referred to above.

Details of one or more embodiments are set forth in the accompanying drawings and the description below. Other features, objects, and advantages will be apparent from the description, drawings, and claims.

BRIEF DESCRIPTION OF DRAWINGS

In the following embodiments of the disclosure are described in more detail with reference to the attached figures and drawings, in which:

FIG. 7 is a diagram showing partitioning of a video frame into coding tree units;

FIG. 8 is a diagram showing partitioning of a coding tree unit into coding units;

DETAILED DESCRIPTION

Figure 1:
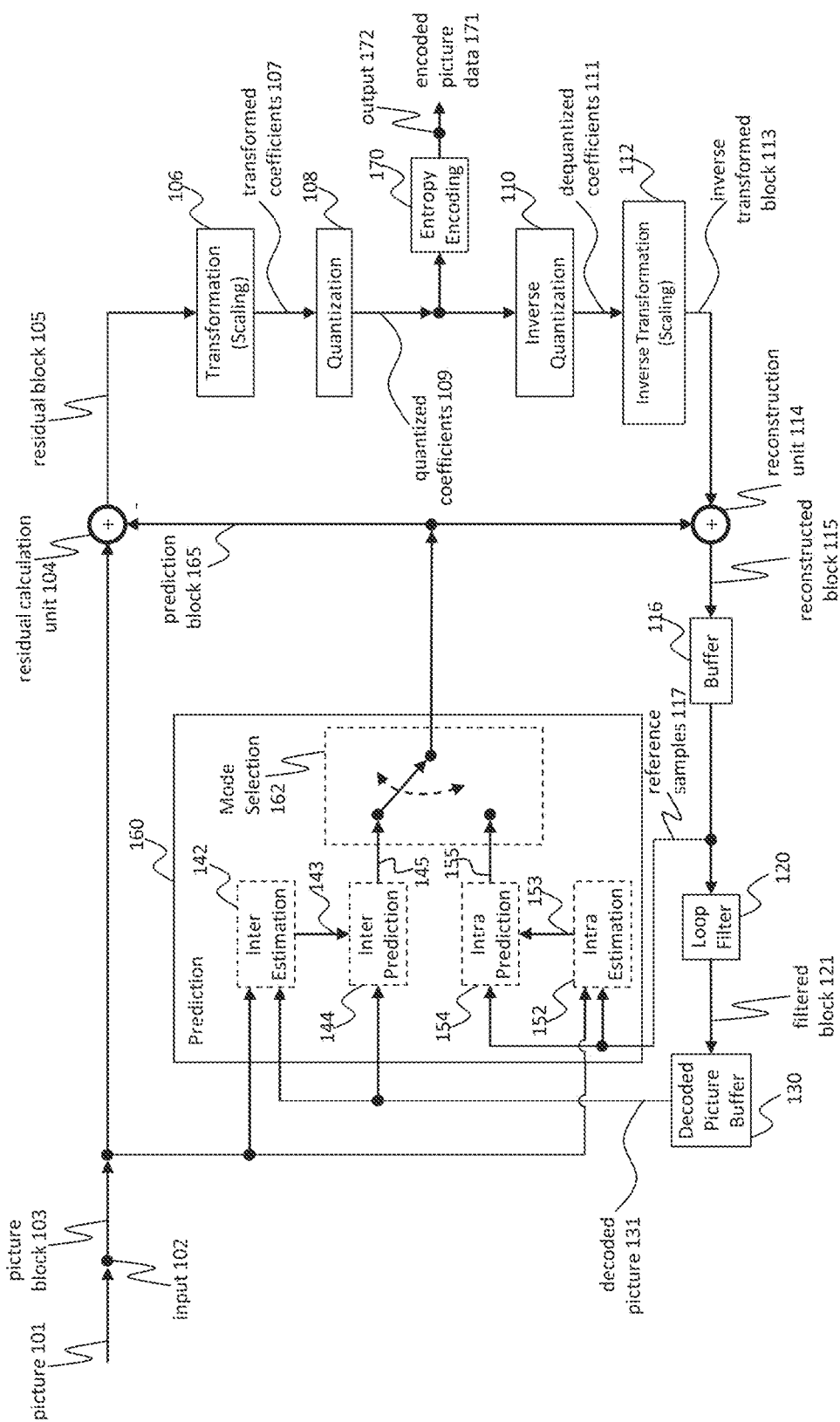
FIG. 1 is a block diagram showing an example of a video encoder configured to implement embodiments of the disclosure.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" (or correspondingly "image") is used to refer to a video picture (or correspondingly "video image") of a video sequence (as explained above) and/or to a still picture (or correspondingly "still image") to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3 before describing embodiments of the disclosure in more detail based on FIGS. 4 to 9.

Figure 3:
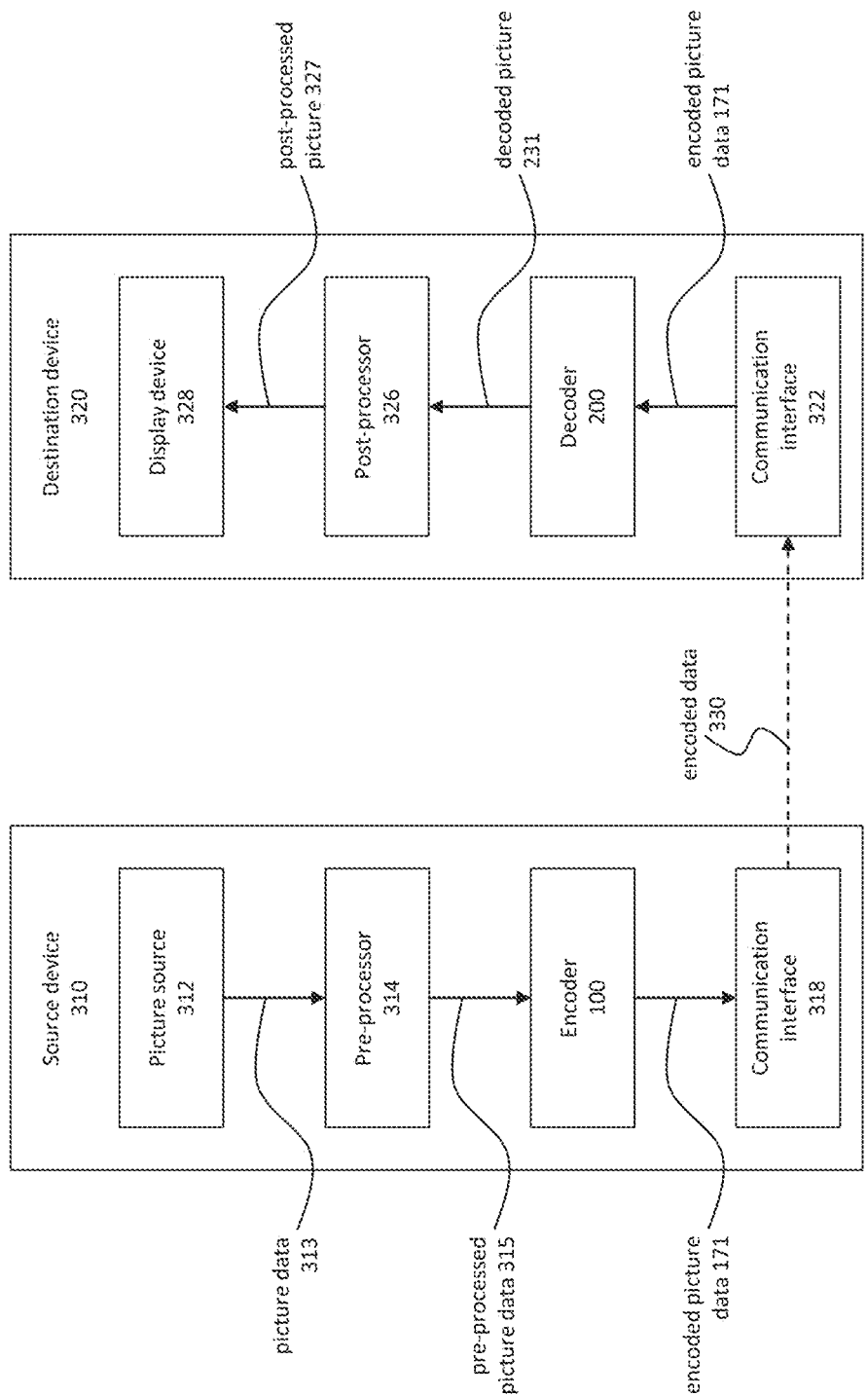
FIG. 3 is a block diagram showing an example of a video coding system configured to implement embodiments of the disclosure.

FIG. 3 is a conceptual or schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 313 may be the same interface as or a part of the communication interface 318. The communication interfaces may be any interfaces such as Ethernet, WLAN, Bluetooth, LTE, or any wired or unwired interface such as satellite or optical interfaces. The transmission may be peer-to-peer or broadcast or multicast.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired (such as optical, power-line, cooper, coaxial, or based on any other media) or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display including beamer, hologram, or 3D/VR glasses.

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments of the disclosure and embodiments of the disclosure are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like, and may use no or any kind of operating system.

Encoder and Encoding Method

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 116, a loop filter 120, a decoded picture buffer (DPB) 130, a prediction unit 160 including an inter estimation unit 142, an inter prediction unit 144, an intra-estimation unit 152, an intra-prediction unit 154, a mode selection unit 162, an entropy encoding unit 170, and an output 172. A video encoder 100 as shown in FIG. 1 may also be referred to as hybrid video encoder or a video encoder according to a hybrid video codec.

Figure 2:
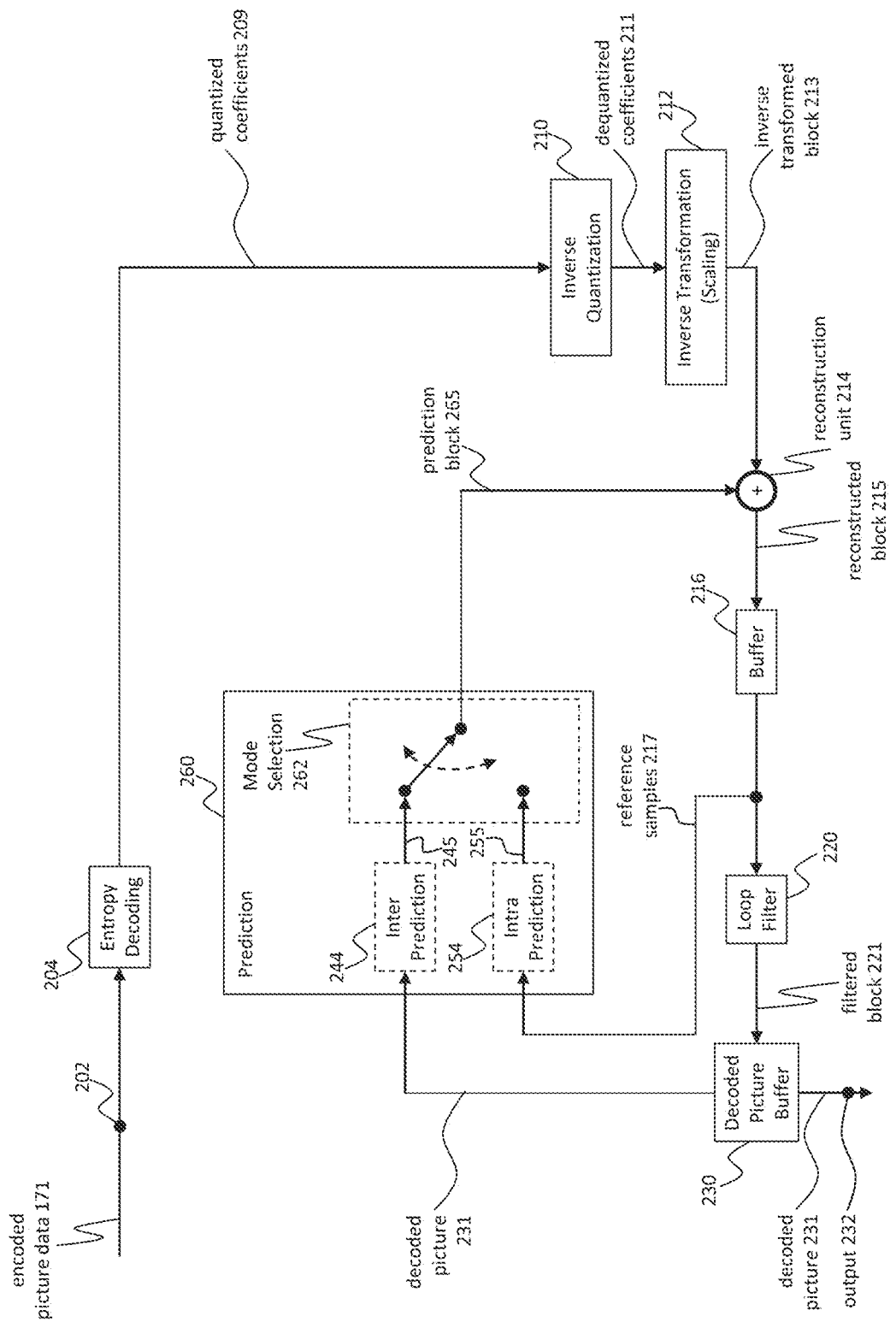
FIG. 2 is a block diagram showing an example structure of a video decoder configured to implement embodiments of the disclosure.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 116, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 100 may comprise a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks hierarchically. The term block refers to a rectangular (not necessarily but possibly square) portion of image.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured to encode the picture 101 block by block, e.g. the encoding and prediction is performed per block 103.

Residual Calculation

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain.

Transformation

The transformation unit 106 is configured to apply a transformation, e.g. a spatial frequency transform or a linear spatial (frequency) transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

Quantization

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 110, may include multiplication by the quantization step size. Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or respectively of the quantization unit 108) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine (e.g. add) the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121. Other or further filet may be applied in the loop.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 1) one or a plurality of filters (loop filter components/subfilters), e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph. Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the disclosure may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 131 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 131, or at least one or a plurality of previously reconstructed blocks, e.g. reconstructed blocks of one or a plurality of other/different previously decoded pictures 131, for inter estimation (or "inter picture estimation"). E.g. a video sequence may comprise the current picture and the previously decoded pictures 131, or in other words, the current picture and the previously decoded pictures 131 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 144, both functionalities may be performed as one (inter estimation requires/comprises calculating an/the inter prediction block, i.e. the or a "kind of" inter prediction 144), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of (predetermined) intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion (e.g. . . . ).

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation (typically/always) requires/comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

FIG. 2 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 262 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 262 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an intra prediction unit 254, wherein the inter prediction unit 244 may be identical in function to the inter prediction unit 144, and the intra prediction unit 254 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 231, e.g. via output 232, for presentation or viewing to a user.

Inter-Prediction Parameters

In order to efficiently code the reference picture, H.265 codec (ITU-T, H.265, Series H: Audiovisual and multimedia systems: High Efficient Video Coding) provides a list of reference pictures assigning to list indices respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The lists L0 and L1 may be defined in the standard and fixed. However, more flexibility in coding/decoding may be achieved by signaling them at the beginning of the video sequence. Accordingly, the encoder may configure the lists L0 and L1 with particular reference pictures ordered according to the index. The L0 and L1 lists may have the same fixed size. There may be more than two lists in general. The motion vector may be signaled directly by the coordinates in the reference picture. Alternatively, as also specified in H.265, a list of candidate motion vectors may be constructed and an index associated in the list with the particular motion vector can be transmitted.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already encoded/decoded motion vectors from spatial neighboring blocks or from temporally neighboring or co-located blocks in the reference picture. In H.264/AVC, this is done by doing a component wise median of three spatially neighboring motion vectors. Using this approach, no signaling of the predictor is required. Temporal MVPs from a co-located block in the reference picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs, is used for motion vector derivation. The variable coding quad-tree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block.

Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

Figure 4:
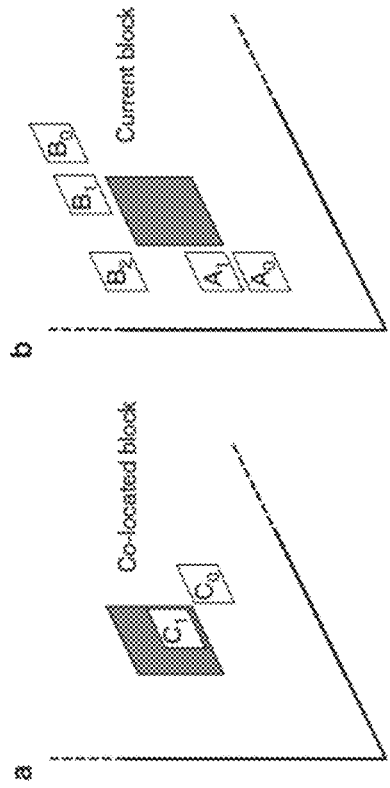
FIG. 4 is a diagram showing motion vector predictor and merge candidates for a current block.

FIG. 4 illustrates in its portion b inter prediction that uses spatially related candidate blocks. In particular, a current block is surrounded by its spatial neighbors A0, A1 (at the left, vertical, boundary of the current block) and spatial neighbors B0, B1, and B2 (at the top, horizontal, boundary of the current block. In portion of the FIG. 4, inter prediction of the current block uses the temporally related blocks such as blocks C0 and C1. Blocks C0 and C1 are in picture different from the current picture in which the current block is located.

Inter prediction of the current block requires that the following information (motion prediction information) is known (e.g. signaled) for a coding block:
 (Temporal) prediction direction (this corresponds to indices of the reference frames that are used for inter prediction).
 Motion vectors pointing to each reference frame.
 Optionally (if applicable), whether the prediction is bi-directional or unidirectional (in general, how many motion vectors in the corresponding different reference pictures are provided to predict the current block).

Also, it may be signaled whether there is residual pixel data (transform coefficients) or not for the current coding block. Since it is not efficient to send all of the data for each coding block, skip and merge prediction modes are used in HEVC. If a block is coded in merge mode (application of the merge mode may be signaled by a flag in the bitstream), then it inherits all of the motion information from a neighboring block such as the blocks A0, A1, B0, B1, B2 shown in the figure. An additional index is sent to specify which neighbor is used. The index is an index into a list of motion parameter candidate list (sometimes also referred to more specifically as motion vector candidate list) which is created according to rules known to the encoder and decoder out of the motion parameters of the spatially and/or temporally relates (for instance directly adjacent or possibly also not directly adjacent but located in the surrounding of the current block).

In other words, block merging operation includes two steps. In the first step a candidate list is constructed using the neighboring blocks (spatial or temporal). In the candidate list construction process identical motion information is discarded from the list (via redundancy checks) and an ordering is applied on the list entries. In the second step, a candidate is selected from the list based on the similarity to the current block being encoded (at the encoder) or using a signaled merge index (at the decoder). After the motion vectors are identified by the merge index, the residuals are inserted into the bitstream. Skip mode is similar to merge mode, the only difference is that skipped blocks do not have residual information.

Figure 5:
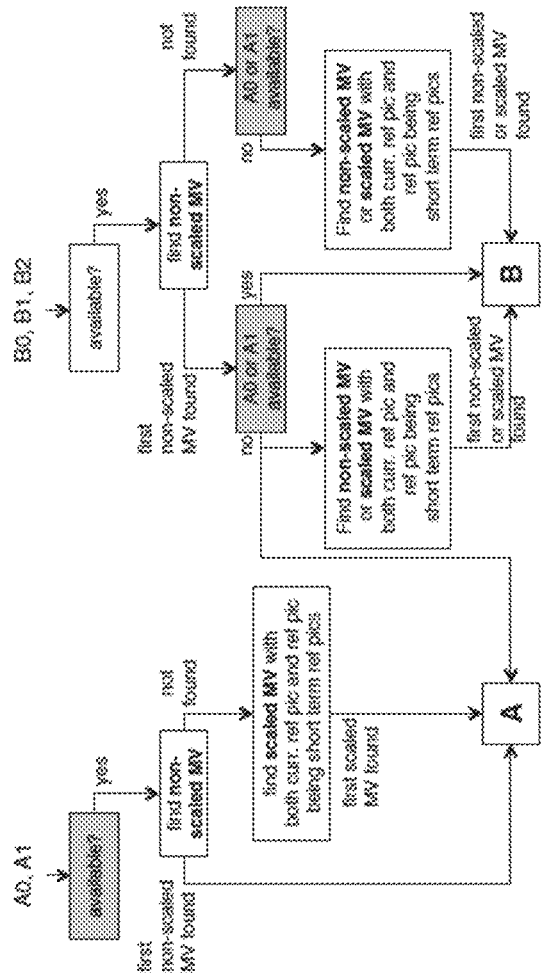
FIG. 5 is a flow chart showing derivation of spatial Advanced Motion Vector Prediction, AMVP, candidates.

During AMVP (Advanced Motion Vector Prediction) list construction as shown in FIG. 5 (taken from section 5.2.1.1 entitled "AMVP Candidate List Construction" of the book High Efficiency Video Coding (HEVC) by Vivienne Sze et.al, Springer 2014 incorporated herein by reference) are applied. In H.265 a fixed number of entries (e.g. two in FIG. 5) are used in order to improve parsing robustness. A similar candidate derivation process is applied for merge list construction, where the number of entries in the list is fixed to five. In general, the candidate list may have any number of candidates.

Figure 6:
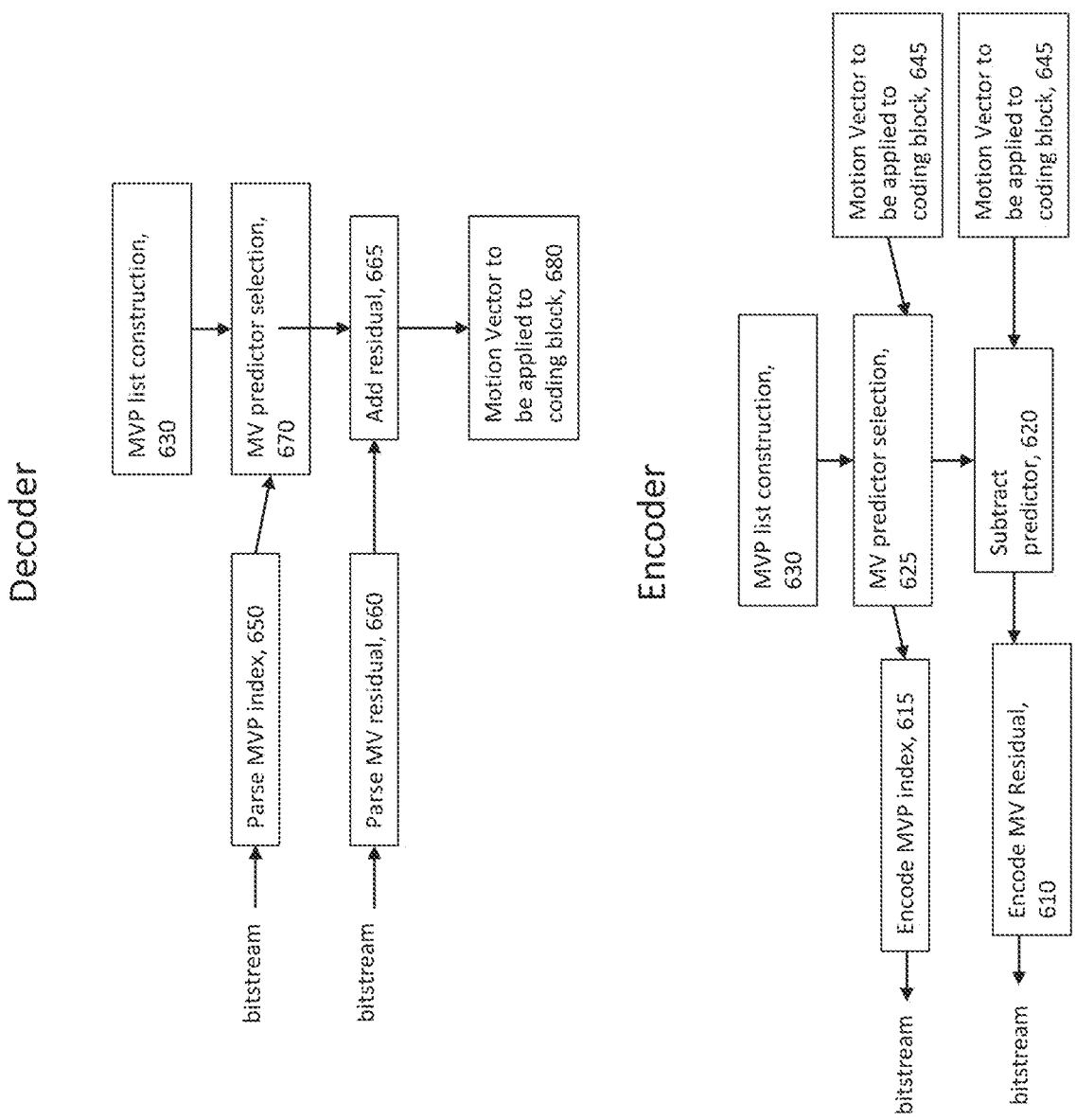
FIG. 6 is a flow chart showing decoder and encoder operation in AMVP.

FIG. 6 illustrates Advanced Motion Vector Prediction (AMVP) which is also described in more detail in Section 5.2.1 titled "Advanced Motion Vector Prediction" of the book High Efficiency Video Coding (HEVC) by Vivienne Sze et.al, Springer 2014. In particular, on the bottom of FIG. 6, shows operation at the encoder. The bitstream is added encoded 610 motion vector residuals. The motion vector residuals are obtained by subtracting 620 from the current motion vector the predictor for the motion vector, i.e. motion vector obtained from the motion vector prediction list based on the motion vector 645. Moreover, in order to enable reconstruction of the current prediction block at the decoder, the encoder also includes into the bitstream encoded 615 indication (index) which identifies within motion vector prediction list the selected motion vector predictor. The selection is performed in step 625 out of the motion vector prediction list constructed in step 630. The selection may be performed by selecting the candidate which is most similar to the motion vector 645 determined for the current prediction block.

The decoder portion is shown in the top part of FIG. 6. In particular, the decoder portion shows parsing 660 of the encoded motion vector residual from the bitstream and parsing 650 of the motion vector prediction index from the bitstream. The parsed index is used to select 670 the motion vector prediction out of the list of motion vector predictions constructed 630 in the same way at the decoder as it was done at the encoder. In particular, the list is constructed and the parsed index indicates the motion vector prediction from the list which is to be selected and applied to obtain the motion vector predictor. Then the motion vector prediction is added 665 to the parsed motion vector residual and the motion vector to be applied to the coding block (current prediction block) is obtained 680 and applied to obtain the block prediction.

In other words, the AMVP process applies the following equation to construct the MV to be applied to a coding block: MV=MVpredictor+MVresidual, i.e. the motion vector MV of the current prediction block is obtained as a sum of the prediction MVpredictor and residuals MVresidual for this block.

The motion vector predictor list construction 630 is performed identically in encoder and decoder. This is exemplified, for instance, in "*JVET-F*1001 *Algorithm description of Joint Exploration Test Model 6 (JEM6)*" document of Joint Video Exploration Team (JVET). AMVP first constructs a list of motion vector predictors, from which one of the candidates is selected as the predictor of the MV of the coding block.

During the list construction, additional checks are performed in order to ensure that the list size is fixed (e.g. two entries long) and that motion vector (in general, motion parameter) candidates are available. The list pruning process compares motion vectors with the list entries and discards one of them if they are identical. Alternatively, other types of redundancy checks might be employed, such as checking whether two motion vectors are similar (according to a distance metric and a corresponding threshold).

As already mentioned, according to recent video coding standards since H.261, pictures of video sequences are typically divided into non-overlapping blocks. Moreover, in recent block based video coding schemes (H.264, H265 etc.), blocks are processed using z-scan and raster scan orders. In general (due to the results of z-scan and raster scan coding) the processing order of blocks follow a pattern, from left to right and from top to bottom. Block-based video coding and the block coding order are illustrated in FIGS. 7 and 8.

Figures 7, 8:
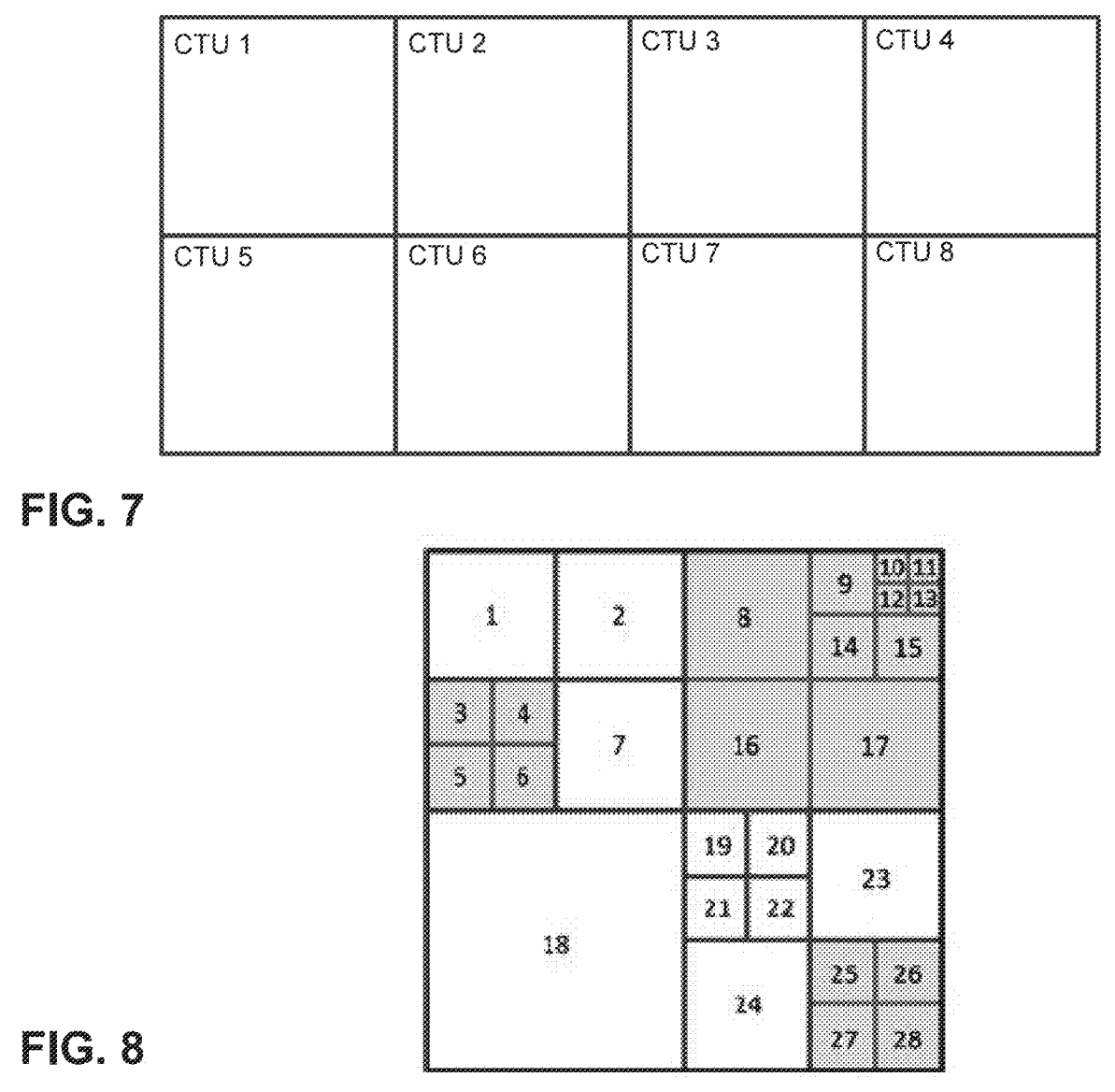

A picture frame (video frame) is first partitioned into basic units called coding tree unit (CTU), as shown in FIG. 7. A coding tree unit (CTU) represents the basic processing unit in previous video coding standards such as HEVC. The size of a CTU is usually selected by the encoder. A CTU consists of a luma coding tree block (CTB), the corresponding chroma CTBs and syntax elements. The size of a luma CTB can be chosen, for example, as 16×16, 32×32, or 64×64 samples. The CTUs of a picture frame are processed in raster scan order. In other words, a frame is usually subdivided into equally sized coding tree units. Each coding tree unit may be further hierarchically split into coding blocks with possibly different sizes.

In particular, a CTU may then be further partitioned into coding units or prediction units, as shown in FIG. 8, using a tree structure, in particular a quadtree structure, meaning that each block may be further split to other four blocks. However, it is noted that other tree structures may also be used such as binary tree structure according to which each block may be further split into two further blocks, or a quadtree plus binary tree structure. Thus, a CTU can be split into multiple coding units (CUs) of variable sizes. The luma and chroma sample arrays that are contained in a CU are referred to as coding blocks (CB). The CUs represent the processing units to which a coding mode is assigned. For each CU, a prediction mode is signaled inside the bit stream.

The prediction mode indicates whether the CU is coded using intra-picture prediction (spatial prediction) or motion-compensated prediction (temporal prediction). If a CU is coded using inter-picture prediction, the luma and chroma CBs can be further split into so called prediction blocks. A prediction block is a block of samples of luma or chroma component that uses the same motion parameters for motion-compensated prediction. The motion parameters include the number of motion hypotheses (the term "motion hypotheses refers to whether uni-prediction or bi-prediction is applied"), as well as the reference picture index (RefPic) and motion vector for each of the motion hypotheses. I.e. a CTB may be partitioned into four coding blocks (CBs), and a resulting coding block may be respectively further partitioned into coding blocks until a predetermined minimum size, for example 4×4 samples, is reached. The size of the luma CTB is the largest supported size for a luma CB. Splitting of a CTU into luma and chroma CBs may be signaled jointly. Coding units/prediction units are processed in z-scan order. Alternatively, as described in JVET-G1001, quadtree plus binary tree structure (QTBT) could be used. The QTBT structure removes the concepts of multiple partition types, i.e. it removes the separation of the CU, PU and TU concepts, and supports more flexibility for CU partition shapes.

In most video codecs, a picture frame is encoded and decoded block by block. In the FIG. 7, the blocks (denoted by CTU x) are shown as example. The coding and decoding order of the blocks follow the raster scan order. First row of CTUs (CTU 1 to CTU 4) are coded first left to right, before moving to the second row of CTUs (CTU 5 to CTU 8). Some of the information utilized in the encoding/decoding of first row of CTUs (or generally the row of CTUs neighboring and preceding in processing order the row including the current block) need to be utilized in coding of the second row (or generally the row including the current block) in order to improve compression efficiency, such as sample values of one or more rows of samples neighboring the boundary between the first row and second row of CTUs, used e.g. for intra prediction, deblocking filtering, etc. This information from the first row may further include motion information. In hardware implementations the information necessary for encoding/decoding of first row may be stored in a specially designed on-chip memory, typically named "line buffer", in order to efficiently encode/decode the second raw of CTUs. It is important to reduce the size of this on-chip memory in order reduce the implementation cost.

Figure 9:
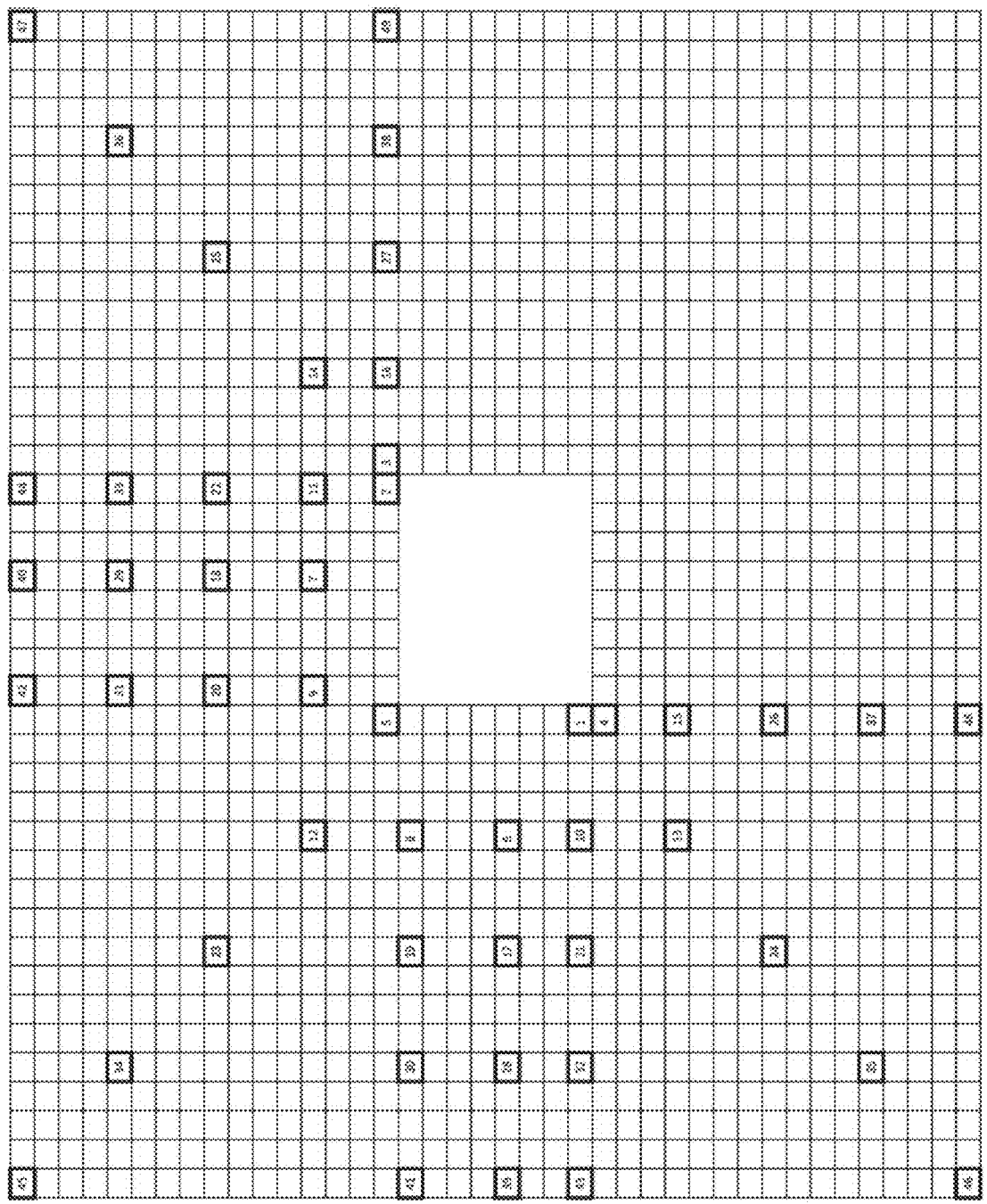
FIG. 9 is a diagram showing motion vector prediction using non-adjacent spatial candidates.

A motion vector prediction method shown by JVET-J0021 (version 2—date Apr. 13, 2018 05:02:50) by Qualcomm and Technicolor, which can be obtained from http://phenix.it-sudparis.eu/jvet/and which is incorporated herein by reference, is illustrated in FIG. 9. This method uses non adjacent spatial candidates to predict the motion vector for the current block, i.e. blocks which are not immediate neighbors of the current block. In FIG. 9, the current block is shown as the white rectangle in the center. The surrounding blocks are shown as smaller blocks since a predetermined block size, which is typically 4×4, is used as a granularity for motion parameter storage. However, the present disclosure is not limited thereto, for instance, motion prediction may also be performed on sample scale. For example as shown in the FIG. 9, the blocks which are spatial candidates are marked by bold lines and numbered 1 to 49. Accordingly, the motion vector of the current block can be predicted using any of the blocks 1 to 5 adjacent to the current block and non-adjacent blocks numbered 6 to 49.

However, the additional spatial candidates (e.g. non-adjacent spatial candidates) such as blocks located above the current block, may not belong to the same CTU. Therefore this method may require additional on-chip memory to store additional motion vector information.

Figure 10:
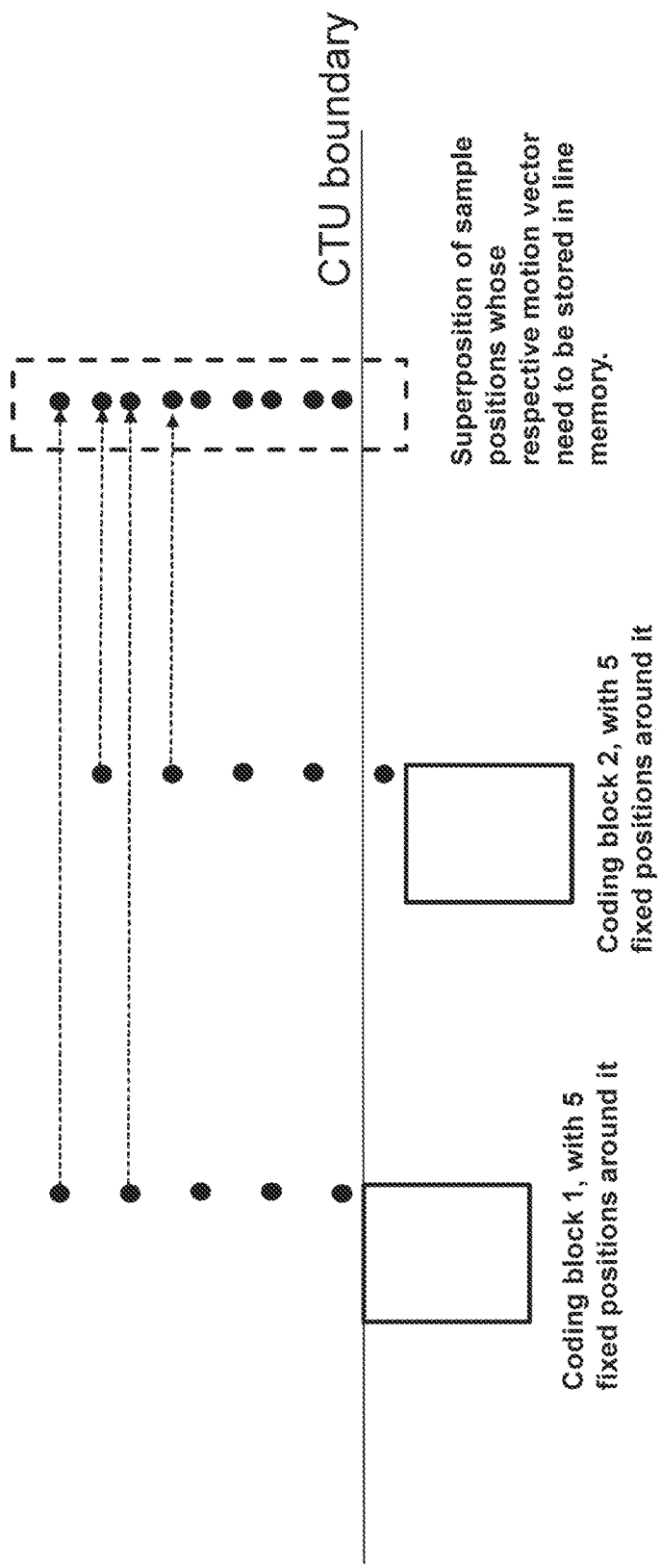
FIG. 10 is a diagram showing determination of motion vector candidates using fixed candidate positions with respect to coding blocks.

A reason why the memory necessary for storing motion information can become very large is shown in FIG. 10. In particular, according to JVET-J0021, a fixed sample position pattern corresponding to a block pattern (a sample representative of a block is used to as a beginning or end point of a motion vector, which may be defined, for example by the standard, to be the top left sample of the block), and at the same time, a fixed sample pattern/block pattern is defined around the current coding block according to which the spatial candidates for motion vector prediction are arranged. However, a coding block inside a CTU can have any distance to the CTU boundary, depending on the partitioning of a particular CTU. Therefore the fixed position pattern is shifted with respect to the CTU boundary for each coding block. As shown in FIG. 10, a first coding block (block 1) and a second coding block (block 2) each have fixed sample positions arranged in a pattern fixed around the respective blocks (five sample positions are shown for each block). Since the blocks to be processed have different distances to the CTU boundary, the sample positions whose respective motion parameters (motion vector, reference picture, uni/bi-prediction) need to be stored in the on-chip memory may generally belong to different lines of pixels, which is why the superposition of sample position which needs to be stored for motion vector prediction is likely to include additional sample positions for each additional coding block that needs to be processed. As can be seen from FIG. 10, an exemplary number of five motion vectors from the upper CTU need to be stored in the on-chip memory to encode/decode coding block 1. Four motion vectors from the upper CTU need to be stored also in the on-chip memory to encode/decode coding block 2. Since coding block 1 and 2 are shifted with respect to the CTU boundary, a total of up 9 motion vectors need to be stored in line buffer to encode/decode both coding blocks (in the figure there are nine motion vectors because one sample position of the pattern arranged around block two is within the same CTU as the block, which might not need to be stored in line buffer). It should be noted that the shift amount of coding block 1 and coding block 2 in this explanatory figure is not intended to reflect an actual quad-tree like partitioning pattern of CTU.

In order to facilitate reducing the size of the on-chip memory required for motion vector/motion parameter determination, the present disclosure provides systems and methods for motion parameter determination.

An apparatus 144, 244 is provided for determining a motion parameter for motion prediction for a prediction of a current coding block. The current coding block 1110 is included in a coding tree unit 1120 which is included in a video frame comprising image samples. The apparatus 144, 244 comprises circuitry which, in operation, selects the motion vector parameter for the current coding block from a plurality of motion parameter candidates. The plurality of motion parameter candidates include a set of motion parameters associated with a set of respective image samples not included in the coding tree unit. Therein, the set of image samples being located at a predetermined position relative to an extended boundary of the coding tree unit.

Corresponding to the apparatus 144, 244, a method is provided for determining a motion parameter for motion prediction for a prediction of a current coding block.

In the above description of the apparatus, a motion parameter for motion prediction of a current coding block can be any of a motion vector (or motion vectors), a reference picture (or reference pictures possibly corresponding to the above-mentioned parameter RefPic) and an indicator indicating whether uni-prediction or bi-prediction is applied. The coding block corresponds to the block to which prediction is applied, in correspondence with HEVC terminology. The coding block also correspond to a (residual) block which is transformed (transform block/TB), however, a coding block may generally also be further be split into smaller transform blocks. The coding block also correspond to the coding block described in JVET-G1001.

Figure 11:
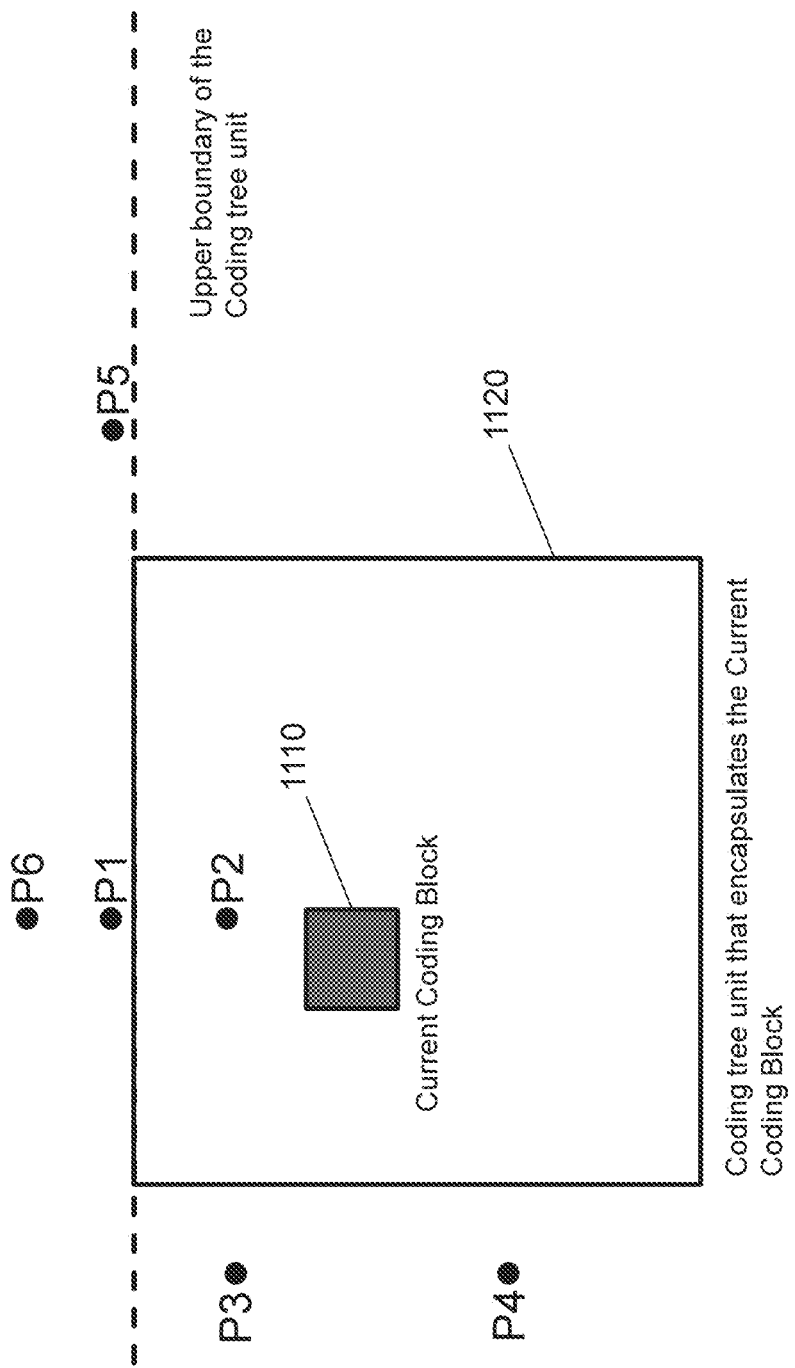
FIG. 11 is a diagram showing motion parameter prediction for a current block.

The above-mentioned predetermined position may correspond to a predetermined distance such as a vertical distance from horizontal boundary and/or a horizontal distance from vertical boundary. FIG. 11 shows a current coding block 1110 which is i.e. encapsulated by (included in) a CTU 1120. The relationship of the coding block 1110 and the CTU 1120 corresponds to the partitioning of a CTU, e.g. following a quad-tree partitioning structure, described above, or quad-tree plus binary tree partitioning structure. In other words the coding tree unit is a unit which is hierarchically partitioned and split into coding units and corresponding coding blocks. Accordingly, all CTUs of a picture frame have same size corresponding to a maximum CU size. Further shown are positions of samples P1-P6 which are arranged in a pattern which is fixed with respect to the coding block 1110. The pattern of sample positions may correspond to a pattern of coding blocks as shown in FIG. 9. I.e. the samples may be, for instance, top left samples of respective blocks. Also shown in FIG. 11 is the extended upper boundary of the coding tree unit 1120. In the example shown, the extended upper boundary of the coding tree unit extends from the left most vertical edge of the picture frame to the right most vertical edge of the frame boundary. P1, P5, P6 are the pixel samples that are above top pixel samples of the current Coding tree unit. In particular, P1 and P5 are the pixel samples that are closest to the upper extended boundary of the current Coding tree unit. An extended boundary of a coding tree unit is a boundary of the coding tree unit extended to the edges of the picture frame. In other words, the extended boundary is a line running across the picture frame from one edge to the respective opposite edge, a portion of the extended CTU boundary being an actual CTU boundary. The extended boundary corresponds to a horizontal boundary of a row of CTUs or a vertical boundary of a column of CTUs included in the video frame. I.e. an extended horizontal boundary (such as the extended upper boundary shown in FIG. 11) reaches from the left edge to the right edge of the picture frame, and an extended vertical boundary reaches from the top edge to the bottom edge of the picture frame. In general, the extended boundary may be one or more of an extended top, left, bottom, or right boundary, depending on the CTU scan (processing order, in particular coding order). The term "sample" generally refers to a pixel sample, and is used to denote either a pixel or the pixel components (SGB, luma and chroma components, etc.).

The apparatus 144, 244 for determining a motion parameter may be included in a video picture encoder 100 or decoder 200 when the above described merge mode or skip mode or AMVP candidate list construction is applied. In these techniques, pruning/redundancy check is used to construct a candidate list including the plurality of motion vector candidates (in general, motion parameter candidates) corresponding to respective samples. After the list is constructed, the SAD (sum of absolute differences) or another cost function is used at the encoder to select the motion vector of the current block 1110 from among the candidates, and an indicator indicating the selected motion vector (e.g. a list index) is signaled to the decoder. The list construction is performed in the same way on the decoder side. The selected motion parameter is obtained based on the received indication.

As mentioned, the plurality of motion vector candidates includes a set of motion parameters associated with a set of respective image samples not included in the coding tree unit. For example, the candidate set from which the motion vector candidate for the current block 1110 is selected may further include at least one motion parameter associated with an image sample (which may represent a coding block) within the coding tree unit 1120 (such as the sample position P2 shown in FIG. 11).

Figure 12:
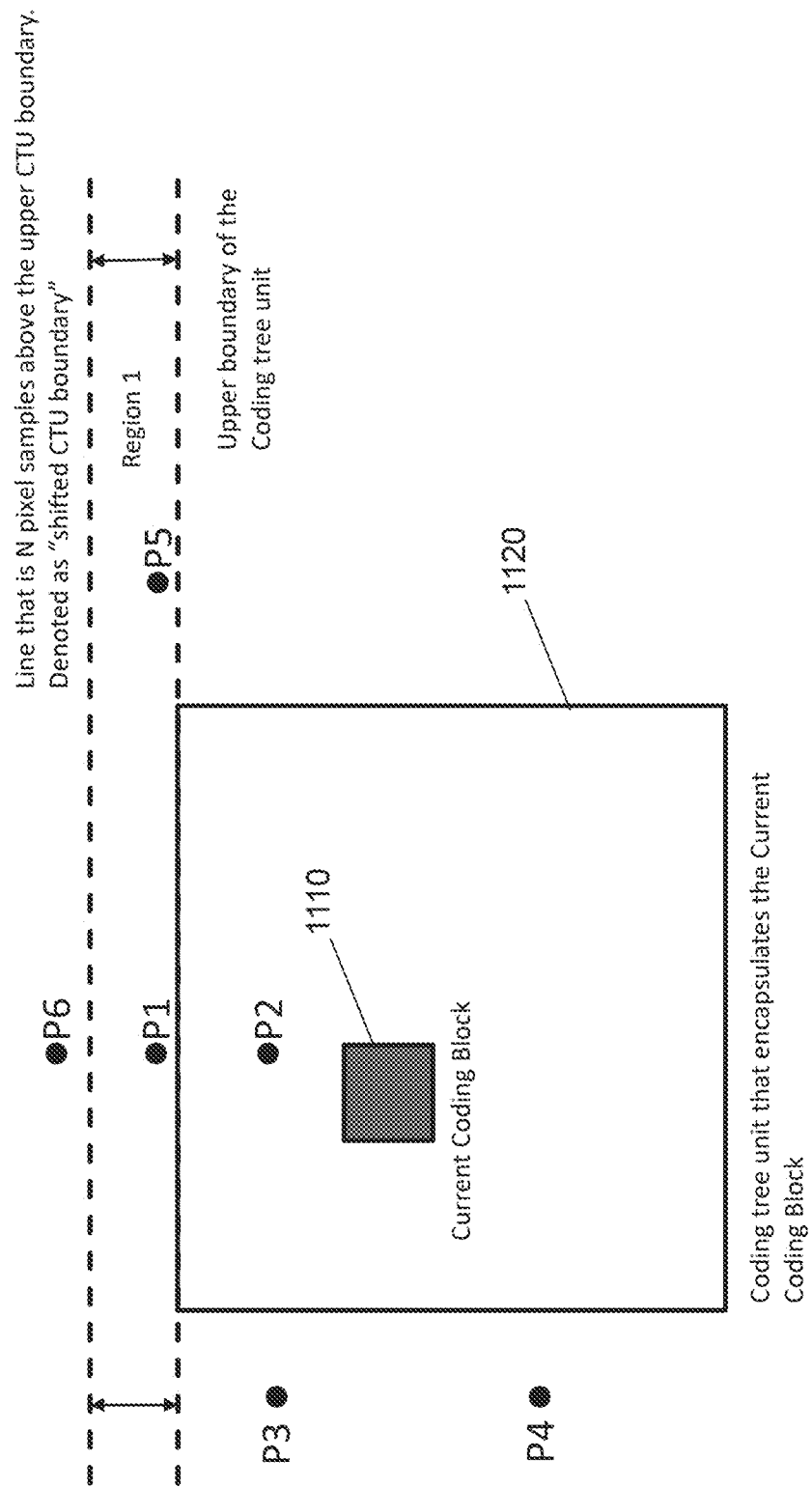
FIG. 12 is a schematic drawing illustrating motion parameter prediction for a current block based on motion parameters associated with samples within a region of N lines above the boundary of the CTU.

For example, the set of image samples are located in a first region formed within a predetermined distance from the extended boundary of the coding tree unit. The first region is depicted in FIG. 12. FIG. 12, like FIG. 11, shows the current coding block 1110, the coding tree unit 1120, the sample positions P1-P6, and the extended CTU boundary. Moreover, FIG. 12 shows a line that is parallel to the extended (upper) CTU boundary located is at a predetermined distance (N pixel samples) above the upper CTU boundary, denoted as "shifted CTU boundary". Both the (extended) CTU boundary, parallel to the CTU boundary are lines which run between respective lines of samples. The shifted CTU boundary and the extended CTU boundary constitute boundaries of the first region, and N is the predetermined distance from the extended boundary of the coding tree unit. Accordingly, according to the example shown in FIG. 12, the set of image samples is located between the boundaries of the first region. The first region is formed by one or more lines (i.e. rows or columns) of samples neighboring the extended boundary of the coding tree unit. The first region has the shape of a stripe of samples. In this example, the part of the picture frame which lies beyond the first region with respect the CTU 1120 (e.g. the part of the image frame which is above the first region/above the shifted CTU boundary in FIG. 12) forms a second region not comprising any image samples associated with the plurality of motion vector candidates.

In FIG. 12, the motion vectors (motion parameters) that are used to predict the samples of P1, P2 and P5 can be used to predict the motion vector of the current coding block. P1 and P5 are within the predetermined distance from the extended CTU boundary, i.e. within the first region, and can therefore be used as well. Further, the plurality of motion vector candidates may include motion vector candidates associated with samples within the CTU 1120, such as P1 which may also be used. In some embodiments, the motion vectors of P3 and P4 may be used as well, as will be described later. However, P6, which is not included within the first region as it lies above the shifted CTU boundary cannot be used to predict the motion vector of the current block.

Using FIG. 12, an example is described in the following: The current coding block 1110 can obtain the MV from:
1. below the upper CTU boundary. This part is not changed by the disclosure, already the case in prior art.
2. From region 1 which is defined by upper CTU boundary and line 1, According to the disclosure, the current coding block cannot obtain MV for prediction from the region above Line 1. It should be noted that the current coding block is not necessarily adjacent to the upper CTU boundary. In H.266 video coding standard if a coding block is adjacent to the upper boundary it can use the motion vectors from region 1. But a coding block cannot use the MV from region 1 if it the coding block is not adjacent to the upper CTU boundary. According to the current disclosure, a current coding block can use the motion vectors from region 1 even if it is not adjacent to the upper CTU boundary.

Figure 13:
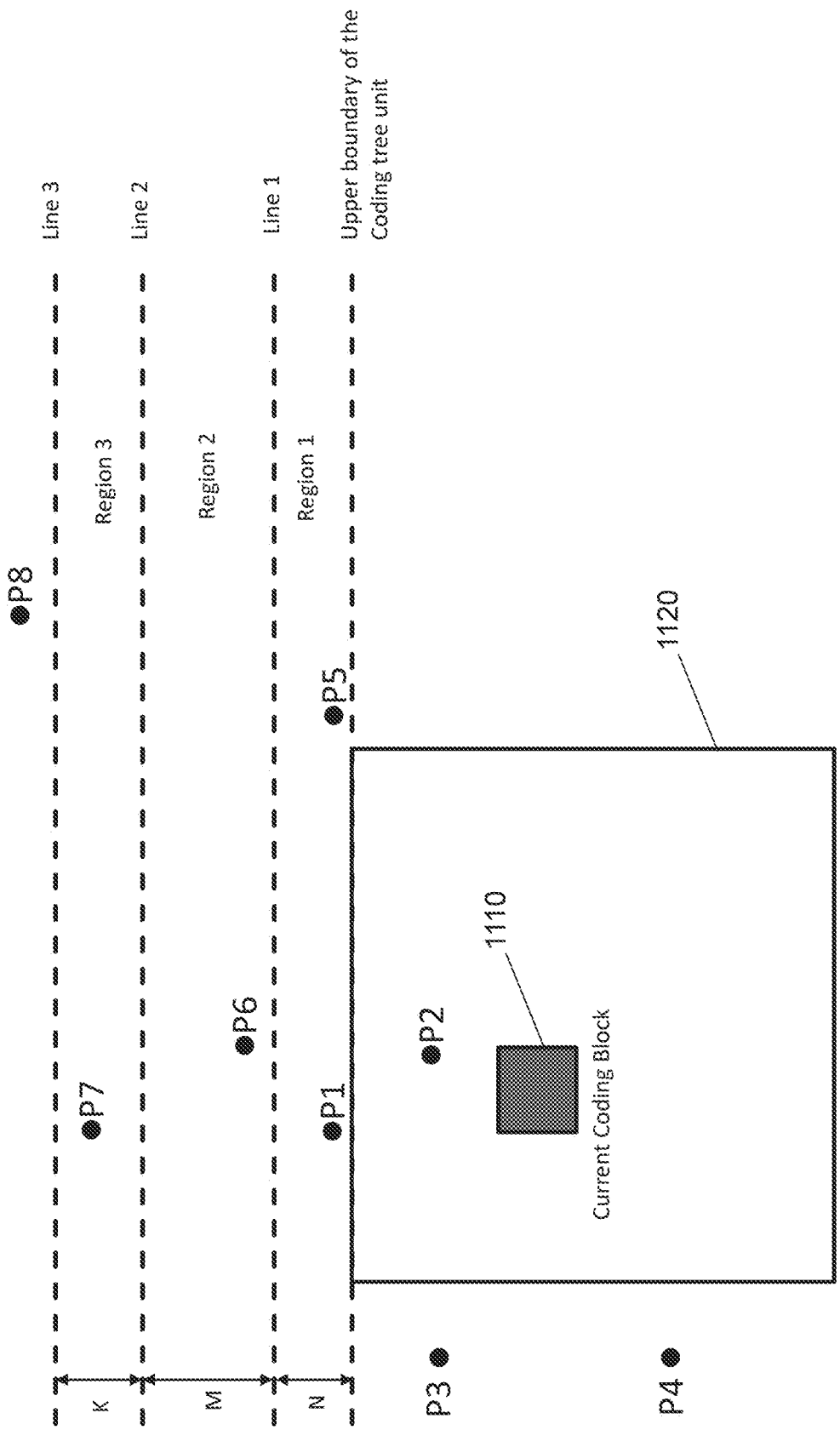
FIG. 13 is a schematic drawing illustrating motion parameter prediction for a current block based on motion parameters associated with samples within regions of N and K lines separated from each other by M lines, all located above the boundary of the CTU.
Figure 14:
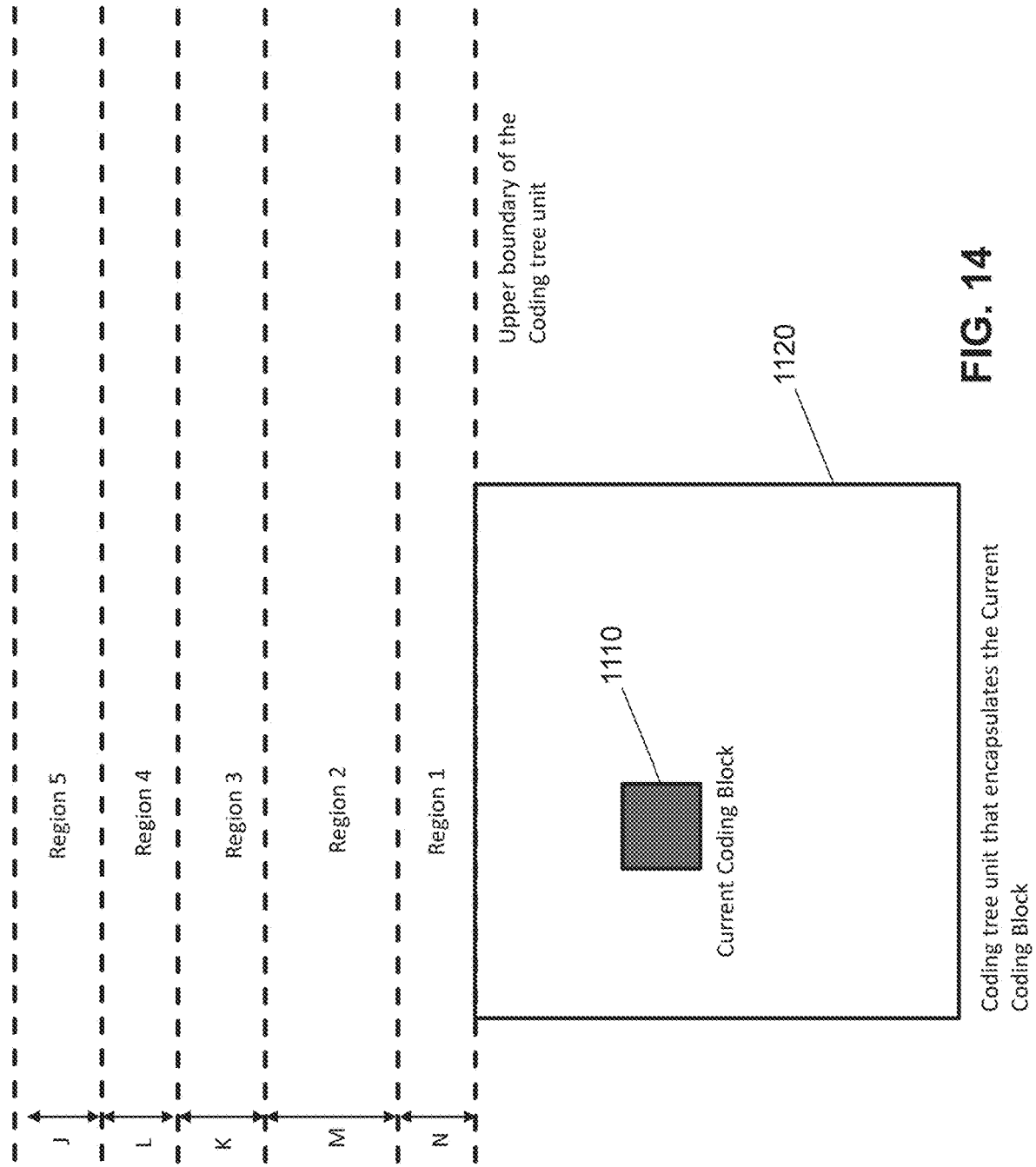
FIG. 14 is a schematic drawing illustrating motion parameter prediction for a current block based on motion parameters associated with samples within every second of regions formed by lines of samples above the boundary of the CTU.

As shown in FIG. 12, the set of image samples is located in a single first region formed within a predetermined distance from the extended boundary of the CTU. However, in some exemplary embodiments, the set of image samples may alternatively be located in a plurality of first regions alternating with one or more second regions not comprising any image samples associated with the plurality of motion vector candidates. The first regions and the second regions are non-overlapping and located in different distances from the extended boundary of the coding tree unit. Examples of the set of image samples being located in a plurality of first regions are shown in FIGS. 13 and 14. I.e. first and second regions are non-overlapping, stripe-like parallel sample regions in the picture frame.

As mentioned, the first region (or each of the plural first regions) may be formed by one of more adjacent lines of samples. In some embodiments, the first regions(s) is/are formed by one or more lines (rows or columns) of coding blocks of a predetermined block size (e.g. a minimum size of coding block for which motion parameters are determinable), the blocks of the predetermined size neighboring the extended boundary of the coding tree unit. In particular, the first region (or the first region closest to the CTU boundary if there are plural first regions) may be formed by or more lines of samples neighboring the extended boundary of the coding tree unit neighboring the extended boundary of the coding tree unit or one or more lines of coding blocks neighboring the extended boundary of the coding tree unit. In the latter case, each of the blocks has the predetermined block size. The number of lines forming different first regions (i.e. the widths of different first regions) may be the same or different. Moreover, different second regions may have respectively different widths. Like the extended CTU boundary, the one or more lines composing the respective first and second regions reach from one edge to the opposite edge of the picture frame.

In particular, in FIG. 13, two first regions and one second region are shown. Lines which are parallel to the extended CTU boundary at respective distances of N, N+M, and N+M+K samples from the CTU boundary are boundaries between the first and second regions. The first regions wherein the set of image samples are located are between the extended CTU boundary and Line 1, and, respectively, Line 2 and Line 3. A second region is located between Lines 1 and 2. They may be a further second region beyond Line 3 with respect to the CTU boundary, i.e. above Line 2 like the region including sample P8 shown in FIG. 13. Alternatively Line 3, i.e. the boundary which is more distant to the extended CTU boundary, may coincide with the picture frame edge (as shown here, the top edge).

The motion vectors that are used to predict the samples that are below line 1, in particular the motion vectors associated with samples P1 and P5 within the first region between Line 1 and the extended CTU boundary, can be used to predict the motion vector of the current coding block 1110, in a similar way as described in connection with FIG. 12. Line 1 is defined with respect to the top (upper) CTU boundary and is N pixel samples above the top horizontal CTU boundary.

Moreover, the motion vectors that are used to predict the samples of that are below line 3 and above line 2 can be used to predict the motion vector of the current coding block 1110. Line 2 is (N+M) samples above the current CTU boundary whereas Line 3 is (N+M+K) samples above the CTU boundary.

On the other hand, the motion vector of a sample P6 or P8 that are not located in the first, but in second regions, are not among the plurality of motion parameter/motion vector candidates cannot be used to predict the motion vector of the current coding block 1110.

An example of the present disclosure is explained using FIG. 13. The current coding unit can obtain the motion vectors for prediction from its surrounding region. For this process the following applies:

The current coding block can obtain the MV from:
1. below the upper CTU boundary.
2. From region 1 (a first region) which is defined by upper CTU boundary and line 1,
3. Region 3 (a first region).

According to disclosure the current coding block cannot obtain MV for prediction from
1. Region 2 (a second region)
2. The region above Line 3 (a second region).

In FIG. 13, three additional lines to the extended CTU boundary are shown which form boundaries between non-overlapping first regions and second regions. The number of additional lines can be increased from 3 to 5, 7, 8, etc., as shown in FIG. 14.

The example shown in FIG. 14 is similar to FIG. 13. In this case the corresponding regions can be denoted as Region 1, 2, 3, 4, . . . . For example, the odd-numbered regions are the first regions comprising the set of image samples associated motion parameter candidates for the current block 1110, and the even-numbered regions are the second regions not comprising any image samples associated with the plurality of motion vector candidates. The motion parameters/vectors that are used in prediction of samples belonging to odd-numbered regions (first regions) can be used to predict the motion vector of the current coding block. The motion parameters/vectors that are used in prediction of samples belonging to even numbered regions cannot be used to predict the motion vector of the current coding block.

As mentioned, the motion parameter for the current coding block 1110 is selected from a plurality of motion parameter candidates, the plurality of motion parameter candidates including a set of motion parameters associated with a set of respective image samples not included in the coding tree unit 1120, and may possibly further including parameters associated with one or more image samples included in the coding tree unit 1120. The set of image samples not included in the coding tree unit is located at a predetermined position relative to an extended boundary of the coding tree unit. Therein, the location of the set of image samples may refer to one or regions within the picture frame in which the samples included in the set are located. I.e. the predetermined position may corresponds to the first region(s). In other words, the set of samples is composed of samples each of which is located in a first region. However, in some embodiments, the plurality of motion parameter candidates does not include any motion parameters associated with image samples outside the first region(s) (i.e. within second regions).

As mentioned, the motion parameter candidates are associated with respective image samples. For example, each motion parameter candidate is associated with a plurality of image samples pertaining to a coding block with a predetermined block size, the coding block consisting of the plurality of image samples. E.g. the predetermined block size is a minimum size of coding block for which motion parameters are determinable. In other words, the minimum block size determines the granularity of motion parameter prediction/determination, and is the block size of predicted blocks in the (current) and reference blocks in the reference picture frame which are connected to the predicted blocks by the motion vector. The predetermined block size, i.e., the granularity of motion estimation, may be 4×4 samples. However, this disclosure is not limited to thereto, and a motion parameter candidate may also be associated a smaller or larger coding block, or with a single sample. I.e. the set of motion vector candidates is associated with a raster in terms of coding blocks of the minimum size. Such a raster may be similar to the pattern of coding blocks shown in FIG. 9, but exclude coding blocks which include samples within second regions, or coding blocks which are represented by (top left) samples within the respective coding blocks and within second regions.

In some embodiments, each of the first regions (i.e. regions of a first type) is formed by a plurality of lines of samples parallel to the extended boundary of the coding tree unit, the plurality of lines corresponding to one or an integer multiple of the predetermined block size. In addition or alternatively, each of the second regions (i.e. regions of a second type) is formed by a plurality of lines of samples parallel to the extended boundary of the coding tree unit, the plurality of lines corresponding to one or an integer multiple of the predetermined block size. The one or more integer multiples of the predetermined block size corresponding to the widths first regions may be different among different first regions and/or different from the one or more integer multiples of the predetermined block size corresponding to the widths of the second regions. Moreover, different second regions may comprise different numbers of lines counted corresponding to multiples of the block size.

The widths of the first regions and second regions, which correspond to numbers of lines of samples and which may be denoted, for example, by the number of lines of samples or multiples of the predetermined block size, are determined in the direction perpendicular to the considered extended CTU boundary (i.e. the boundary from which the above-mentioned predetermined distance is delimits the set of image samples or the first region).

In some embodiments, the predetermined block size corresponding is predefined, for example defined in a standard. In alternative embodiments, the predetermined block size signaled and received in the bitstream.

The extended boundary of the coding tree unit 1120 may be a vertical boundary and/or a horizontal boundary of the coding tree unit. If the extended boundary is horizontal, the lines of samples respectively forming the first and second regions are horizontal lines of samples (i.e. parallel to the boundary), and if the extended boundary is vertical, the one or more lines are vertical lines.

The first and second regions may be formed with respect to only one boundary from among a vertical and horizontal extended boundary or with respect to both boundaries. In case the vertical and horizontal lines are formed with respect to both boundaries, there may be perpendicular arrays of first and second regions intersecting with each other, i.e. first and second regions defined with respect to the CTU boundary horizontal direction overlapping with first and second regions defined in vertical region in a chess-board like array. In such an embodiment, an image sample within a first region of with respect to the horizontal boundary and/or within a first region with respect to a vertical boundary may be determined to be associated with a motion parameter from among the set of motion parameter candidates. Alternatively, an image sample can be determined not to correspond to a motion parameter candidate if it is located within at least one of a second region with respect to a horizontal boundary and a second region with respect to a vertical boundary.

As an alternative to the chess-board like array of vertical and horizontal first and second regions described above, the predetermined position may be relative to only one of a vertical and horizontal extended CTU boundary. In that case, image samples which are located on the same side of the extended CTU boundary and which are not included in the CTU 1120 (such as P3 and P4 in FIGS. 11 to 13), may or may or, alternatively, may not be allowed to correspond to motion vector candidates for the current coding block 1110.

In some embodiments, the apparatus for determining a motion parameter further includes a buffer for storing said set of motion parameters associated with said set of respective image samples, wherein the processing circuitry in operation stores said set of motion parameters associated with said set of respective image samples into the buffer.

In particular, the buffer stores the motion parameters associated with image samples located in the first regions. The buffer does not store any motion further motion parameters, i.e. motion parameters that are not associated with said set of image samples. On the one hand, motion parameters associated with image samples of the coding tree unit 1120 including the current block 1110 need not be stored in the buffer. In particular, they need not be stored in the motion parameter (motion vector) line buffer which may be of a limited size and possibly implemented on chip, i.e. faster than other buffers used.

On the other hand, any motion parameters associated with any image samples that do not belong to said set of image samples (i.e. image samples located in second regions are not stored in the buffer). By excluding such motion parameters associated with image samples or coding blocks which are not located in particular regions (i.e. first regions), the present disclosure may facilitate reducing the buffer size and, thus, implementation costs.

In some embodiments, the buffer may store motion parameters which are in a set of image samples located at a predetermined position (i.e. in first region(s)) relative to a first extended boundary (e.g. a horizontal boundary) of the CTU 1120. In that case, returning to examples shown in FIGS. 12 and 13, the buffer stores motion parameters associated with samples P1 and P5.

In addition according to some examples, motion parameters associated with samples located at a predetermined position with respect to a second boundary (e.g. a vertical boundary) may be stored as well in the buffer (such as samples P3 and P4 in FIGS. 12 and 13). In other words, the buffer may store motion information associated with samples in a row (or rows) of CTUs that has been processed prior (in processing order) to the "current" row including the CTU 1120 encapsulating the current coding block 1110. In addition, the buffer may further store motion information associated with samples in CTUs different from the CTU 1120 comprising the current block 1110 which are in the same row (in processing order) as the current CTU 1120.

Motion parameters associated with samples within second regions (such as P6) are not stored in the buffer.

For instance, the apparatus 144, 244 for determining a motion parameter is embedded in an integrated circuit (chip). In particular, the processing circuitry and the buffer of some embodiments may be integrated on a chip. In other words, the buffer may be an on-chip memory. The buffer (i.e. the on-chip memory) may be called "motion vector line buffer" or, in general "motion parameter line buffer" because it stores, like a line buffer which is also an on-chip memory, information associated with samples/blocks in a previous row(s) (or columns) (previous in in processing order). The buffer may be integrated in such a line buffer.

The disclosure further provides an apparatus 100 for encoding a video frame to generate a bitstream. The encoding apparatus 100 comprises the apparatus 144 for determining a motion parameter according to any of the above-described embodiments, and a binarization unit 170 for generating a bitstream including an indication of the determined motion parameter. The binarization unit may correspond, for instance, to the entropy encoder 170 shown in FIG. 1.

Moreover, the present disclosure provides an apparatus 200 for decoding a video frame from a bitstream. The decoding apparatus comprises a parsing unit for extracting from the bitstream an indication of a motion parameter, and the apparatus 244 for determining a motion parameter according to any of the above-described embodiments. The selection of the motion parameter for the current coding block 1110 is performed based on the extracted indication.

The present disclosure may be applied, for example, in skip mode, merge mode, and AMVP mode. In the merge mode, apart from the indication of the determined motion parameter, the generated/parsed bitstream may include residual information of the current block.

Although they appear similar, there is one main difference between the AMVP and the merge candidate list. The AMVP list only contains motion vectors for one reference list while a merge candidate contains all motion data including the information whether one or two reference picture lists are used as well as a reference index and a motion vector for each list. This significantly reduces motion data signaling overhead.

When the present disclosure is applied to AMVP mode, an indication is coded to identify the motion vector predictor. The motion vector difference between the predictor and the motion vector of the current block needs to be coded.

In some embodiments, the encoded/decoded bitstream may include an indication of the predetermined position of the set of image samples. For instance this indication may be an indicator of the number of lines of samples within the first regions and/or the second regions (i.e. the widths of the first regions and second regions described above). For instance, a single number may indicate the numbers of samples included in all first and second regions, a number of samples for the first regions and a number of samples for the second regions may be indicated, or individual numbers may be signaled for respective first regions and respective second regions may be signaled. For instance, the distances J, K, L, N, M shown in FIGS. 13 14 and can be signaled in the bitstream. However, as an alternative to signaling the indication of the predetermined positions, such as the distances J, K, L, M, N corresponding to numbers of lines of samples within first and/or second regions may also be predefined, i.e. in a standard.

The encoded/decoded bitstream may further include an indicator indicating the above-mentioned predetermined block size such as a minimum size of coding block for which motion parameters are determinable.

For instance, the predetermined position is a distance N from the extended boundary of the coding tree unit and/or spacing of the first and second regions (e.g. corresponding to a single number or plural numbers J, K, L, M, N) expressed in one of Number of samples, and Number of coding blocks of the predetermined block size.

When the predetermined position is a distance N from the extended boundary, the extended boundary and a line at distance N from the extended boundary delimit the first region adjacent to the extended CTU boundary.

I.e. if the predetermined block size is known to the decoding device 200 (by signaling or by standard), the widths of first and second regions may be indicated in the bitstream using numbers of (lines of) coding blocks as an alternative to using the numbers of (lines of) samples.

In other words, the distances J, K, L, N, M can be multiples of minimum coding block size or minimum coding block height, that is defined by the specific codec implementation or signaled in the bitstream. If the smallest allowed coding block is 4×4 in size all samples within such a block have the same motion vector. As example J, K, L, N, M can be multiples of 4 (predetermined coding block size). In that case, the number J, K, L, N, M or the numbers J/4, K/4, L/4, N/4, M/4 may be included in the bitstream.

In correspondence to the apparatuses for determining a motion parameter of the various embodiments disclosed above, the present disclosure also provides a method for determining a motion parameter for motion prediction of a current coding block included in a coding tree unit, the coding tree unit being included in a video frame comprising image samples. The method comprises selecting the motion parameter for the current coding block from a plurality of motion parameter candidates; the plurality of motion parameter candidates including a set of motion parameters associated with a set of respective image samples not included in the coding tree unit, and the set of image samples being located at a predetermined position relative to an extended boundary of the coding tree unit.

Further provided is a non-transitory computer-readable medium storing program instructions which, when executed on a processing circuitry, perform all steps of the method for determining a motion parameter.

Figure 15:
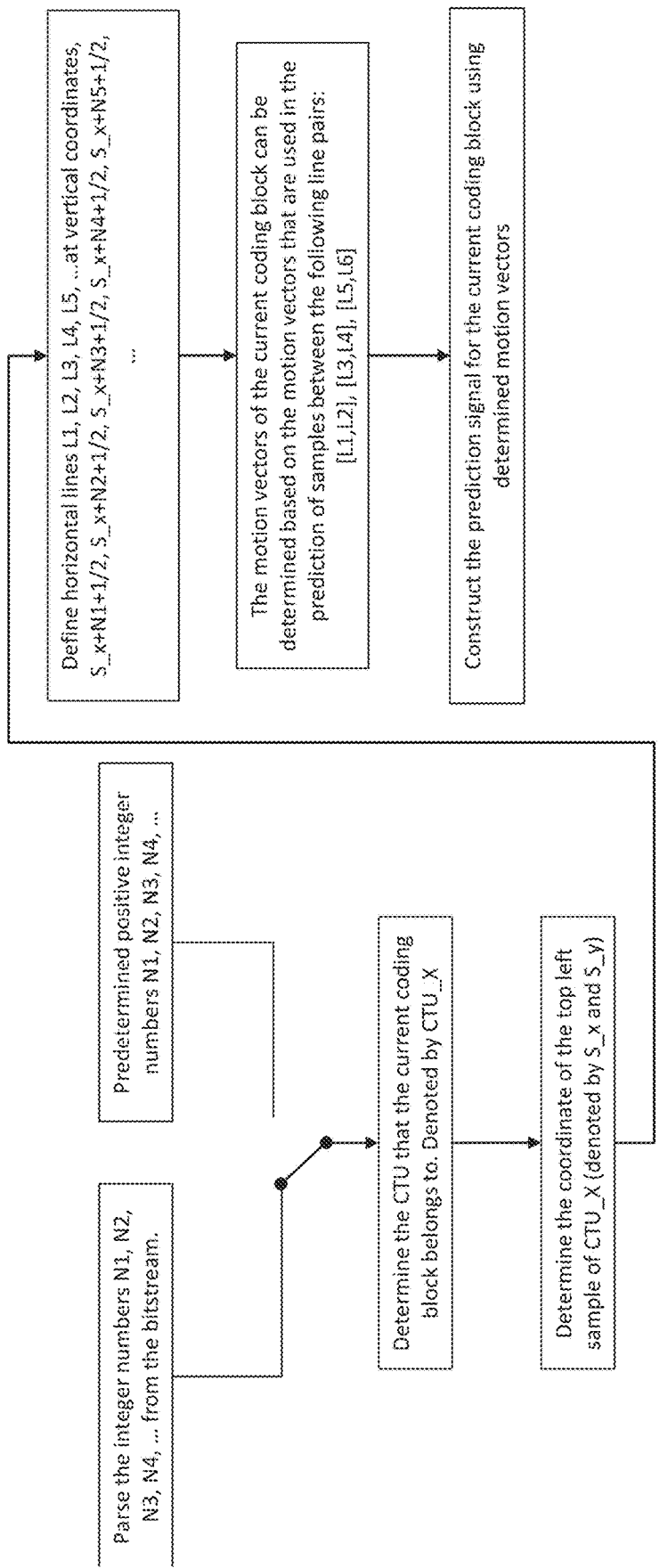
FIG. 15 is a flow diagram illustrating a method for determining motion parameter for a current coding block based on motion parameters associated with samples located only on predetermined regions relative to CTU boundary.

An exemplary embodiment of the method for determining motion parameter for a current coding block based on motion parameters associated with samples located only on predetermined positions relative to CTU boundary is shown in the flow chart of FIG. 15.

First, integer numbers N1, N2, N3, N4, . . . are parsed from the bitstream. As an alternative, the integer numbers N1, N2, N3, N4 nay be predetermined. Then, the CTU 1120 (denoted by CTU_X) is determined that the current coding block 1110 belongs to. As a next step, the coordinate of the top left sample of CTU_X (denoted by S_x and S_y. In the following step, horizontal lines L1, L2, L3, L4, L5, . . . at vertical coordinates, S_x+N1+½, S_x+N2+½, S_x+N3+½, S_x+N4+½, S_x+N5+½, . . . . As a next step, the motion vectors of the current coding block can be determined based on the motion vectors that are used in the prediction of samples between the following line pairs: [L1,L2], [L3,L4], [L5,L6]. Afterwards, the prediction signal for the current coding block is constructed using determined motion vectors.

Therein, N1<N2<N3<N4< . . . . Moreover, the addition of ½ indicates that the lines are running between 2 sample positions, and they do not overlap with/run through samples. In this example, the numbers N1, N2, N3, . . . correspond to distances (in samples or predetermined coding block sizes) from the extended CTU boundary. The method, as shown in FIG. 15, may be modified by signaling (or predefining) widths of the first and second regions (such as numbers, J, K, L, M, N of FIGS. 13, 14) rather than the distances to the extended CTU boundary.

The present disclosure proposes fixing the pattern of sample positions (whose associated motion vectors are used for motion vector prediction) w.r.t. the CTU boundary instead of coding block boundary. This may facilitate reducing the amount of buffer (on-chip memory) which is required to store motion information.

It is noted that the above embodiments, implementations and examples described with reference to the processing circuitries in an encoding or decoding apparatus, are also applicable to the above mentioned encoding and decoding methods, which may correspond to the steps performed by the respective processing circuitries.

Summarizing, embodiments of the present disclosure relate to apparatuses and methods for determination of motion parameters (e.g. motion vectors) for motion prediction of a coding block, and is applicable to video encoding and/or decoding. The motion parameter is selected from motion parameters, which include motion parameters associated with a set of respective image samples not included in the coding tree unit, where the set of image samples are located at a predetermined position relative to an extended boundary of the coding tree unit. The apparatuses and methods of the present disclosure may facilitate reducing on-chip buffer requirements for motion prediction.

Figure 16:
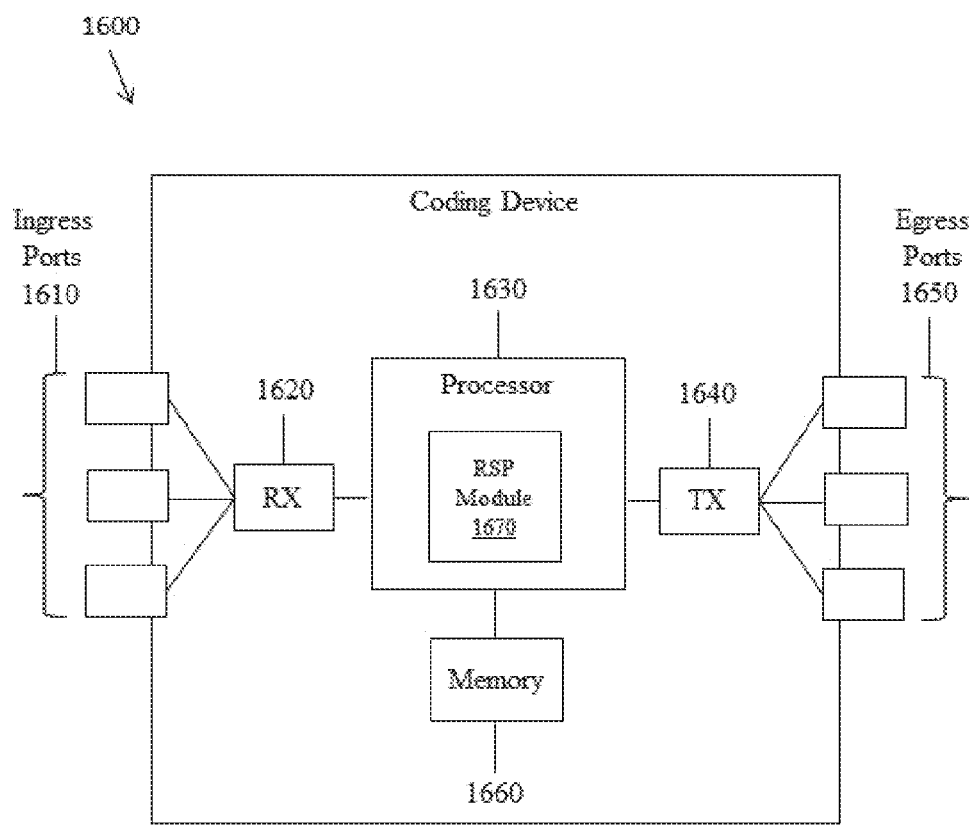
FIG. 16 is a schematic diagram of a coding device.

FIG. 16 is a schematic diagram of a coding device 1600 according to an embodiment of the disclosure. The coding device 1600 is suitable for implementing the disclosed embodiments as described herein. The coding device 1600 comprises ingress ports 1610 and receiver units (Rx) 1620 for receiving data; a processor, logic unit, or central processing unit (CPU) 1630 to process the data; transmitter units (Tx) 1640 and egress ports 1650 for transmitting the data; and a memory 1660 for storing the data. The coding device 1600 may also comprise optical-to-electrical (OE) components and electrical-to-optical (EO) components coupled to the ingress ports 1610, the receiver units 1620, the transmitter units 1640, and the egress ports 1650 for egress or ingress of optical or electrical signals.

The processor 1630 is implemented by hardware and software. The processor 1630 may be implemented as one or more CPU chips, cores (e.g., as a multi-core processor), field-programmable gate arrays (FPGAs), application specific integrated circuits (ASICs), and digital signal processors (DSPs). The processor 1630 is in communication with the ingress ports 1610, receiver units 1620, transmitter units 1640, egress ports 1650, and memory 1660. The processor 1630 comprises a references sample processing (RSP) module 1670. The RSP module 1670 implements the disclosed embodiments described above. For instance, the RSP module 1670 implements, processes, prepares, or provides the various coding operations. The inclusion of the RSP module 1670 therefore provides a substantial improvement to the functionality of the coding device 1600 and effects a transformation of the coding device 1600 to a different state. Alternatively, the RSP module 1670 is implemented as instructions stored in the memory 1660 and executed by the processor 1630.

The memory 1660 comprises one or more disks, tape drives, and solid-state drives and may be used as an overflow data storage device, to store programs when such programs are selected for execution, and to store instructions and data that are read during program execution. The memory 1660 may be volatile and/or non-volatile and may be read-only memory (ROM), random access memory (RAM), ternary content-addressable memory (TCAM), and/or static random-access memory (SRAM).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

LIST OF REFERENCE SIGNS

FIG. 1
100 Encoder
103 Picture block
102 Input (e.g. input port, input interface)
104 Residual calculation [unit or step]
105 Residual block
106 Transformation (e.g. additionally comprising scaling) [unit or step]
107 Transformed coefficients
108 Quantization [unit or step]
109 Quantized coefficients
110 Inverse quantization [unit or step]
111 De-quantized coefficients
112 Inverse transformation (e.g. additionally comprising scaling) [unit or step]
113 Inverse transformed block
114 Reconstruction [unit or step]
115 Reconstructed block
116 (Line) buffer [unit or step]
117 Reference samples
120 Loop filter [unit or step]
121 Filtered block
130 Decoded picture buffer (DPB) [unit or step]
131 Decoded picture
142 Inter estimation (or inter picture estimation) [unit or step]
143 Inter estimation parameters (e.g. reference picture/reference picture index, motion vector/offset)
144 Inter prediction (or inter picture prediction) [unit or step]
145 Inter prediction block
152 Intra estimation (or intra picture estimation) [unit or step]
153 Intra prediction parameters (e.g. intra prediction mode)
154 Intra prediction (intra frame/picture prediction) [unit or step]
155 Intra prediction block
162 Mode selection [unit or step]
165 Prediction block (either inter prediction block 145 or intra prediction block 155)
170 Entropy encoding [unit or step]
171 Encoded picture data (e.g. bitstream)
172 Output (output port, output interface)
FIG. 2
200 Decoder
171 Encoded picture data (e.g. bitstream)
202 Input (port/interface)
204 Entropy decoding
209 Quantized coefficients
210 Inverse quantization
211 De-quantized coefficients
212 Inverse transformation (scaling)
213 Inverse transformed block
214 Reconstruction (unit)
215 Reconstructed block
216 (Line) buffer
217 Reference samples
220 Loop filter (in loop filter)
221 Filtered block
230 Decoded picture buffer (DPB)
231 Decoded picture
232 Output (port/interface)
244 Inter prediction (inter frame/picture prediction)
245 Inter prediction block
254 Intra prediction (intra frame/picture prediction)
255 Intra prediction block
260 Mode selection
265 Prediction block (inter prediction block 245 or intra prediction block 255)
FIG. 3
300 Coding system
310 Source device
312 Picture Source
313 (Raw) picture data
314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data

The invention claimed is:

1. An apparatus for determining a motion parameter for motion prediction of a current coding block included in a coding tree unit, wherein the coding tree unit is included in a video frame comprising image samples, the apparatus comprising:
a processor; and
a memory configured to store computer readable instructions that, when executed, cause the processor to:
select the motion parameter for the current coding block from a plurality of motion parameter candidates, wherein
the plurality of motion parameter candidates including a set of motion parameters associated with a set of respective image samples not included in the coding tree unit,
the set of image samples being located at a predetermined position in a first region relative to an extended boundary of the coding tree unit, and
image samples located in a second region, positioned relative to the first region and the extended boundary of the coding tree unit, are not associated with the set of motion parameters included in the plurality of motion parameter candidates.

2. The apparatus for determining the motion parameter according to claim 1, wherein
the set of image samples is located in the first region formed within a predetermined distance from the extended boundary of the coding tree unit, and/or the set of image samples is located within a plurality of first regions alternating with one or more second regions not comprising any image samples associated with the plurality of motion vector candidates; and
the first and the second regions being non-overlapping and located in different distances from the extended boundary of the coding tree unit.

3. The apparatus for determining the motion parameter according to claim 2, wherein the first region is formed by:
one or more lines of samples neighboring the extended boundary of the coding tree unit.

4. The apparatus for determining the motion parameter according to claim 2, wherein each motion parameter candidate is associated with a plurality of image samples pertaining to a coding block with a predetermined block size.

5. The apparatus for determining the motion parameter according to claim 4, wherein the first region is formed by one or more lines of coding blocks of the predetermined block size neighboring the extended boundary of the coding tree unit.

6. The apparatus for determining the motion parameter according to claim 4, wherein:
    each of the first regions is formed by a plurality of lines of samples parallel to the extended boundary of the coding tree unit, the plurality of lines corresponding to one or an integer multiple of the predetermined block size; and/or
    each of the second regions is formed by a plurality of lines of samples parallel to the extended boundary of the coding tree unit, the plurality of lines corresponding to one or an integer multiple of the predetermined block size.

7. The apparatus for determining the motion parameter according to claim 4, wherein the predetermined position is a distance N from the extended boundary of the coding tree unit and/or spacing of the first and second regions are expressed in one of:
    a number of samples, and
    a number of coding blocks of the predetermined block size.

8. The apparatus for determining the motion parameter according to claim 1, wherein the extended boundary of the coding tree unit is a vertical boundary and/or horizontal boundary.

9. The apparatus for determining the motion parameter according to claim 1, wherein the plurality of motion parameter candidates further includes a motion parameter associated with a sample located within the coding tree unit.

10. The apparatus for determining the motion parameter according to claim 1, further including a buffer for storing the set of motion parameters associated with the set of respective image samples, wherein the set of motion parameters associated with the set of respective image samples are stored into the buffer.

11. The apparatus for determining the motion parameter according to claim 1, wherein the apparatus is embedded on an integrated circuit, an encoding apparatus, or a decoding apparatus.

12. The apparatus for determining the motion parameter according to claim 1, wherein the extended boundary of the coding tree unit extends from a first edge of the video frame to a second edge of the video frame.

13. The apparatus for determining the motion parameter according to claim 1, wherein the first and second regions extend in a first direction from the extended boundary, and the first region, second region, and extended boundary are parallel to each other along the first direction.

14. A method for determining a motion parameter for motion prediction of a current coding block included in a coding tree unit, wherein the coding tree unit is included in a video frame comprising image samples, the method comprising:
    selecting the motion parameter for the current coding block from a plurality of motion parameter candidates, wherein
    the plurality of motion parameter candidates including a set of motion parameters associated with a set of respective image samples not included in the coding tree unit,
    the set of image samples being located at a predetermined position in a first region relative to an extended boundary of the coding tree unit, and
    image samples located in a second region, positioned relative to the first region and the extended boundary of the coding tree unit, are not associated with the set of motion parameters included in the plurality of motion parameter candidates.

15. The method for determining the motion parameter according to claim 14, wherein
    the set of image samples is located in a first region formed within a predetermined distance from the extended boundary of the coding tree unit, and/or the set of image samples is located within a plurality of first regions alternating with one or more second regions not comprising any image samples associated with the plurality of motion vector candidates; and
    the first and the second regions being non-overlapping and located in different distances from the extended boundary of the coding tree unit.

16. The method for determining the motion parameter according to claim 15, wherein the first region is formed by one or more lines of samples neighboring the extended boundary of the coding tree unit.

17. The method for determining the motion parameter according to claim 15, wherein each motion parameter candidate is associated with a plurality of image samples pertaining to a coding block with a predetermined block size.

18. The method for determining the motion parameter according to claim 17, wherein the first region is formed by one or more lines of coding blocks of the predetermined block size neighboring the extended boundary of the coding tree unit.

19. The method for determining the motion parameter according to claim 14, wherein the plurality of motion parameter candidates further includes a motion parameter associated with a sample located within the coding tree unit.

20. A non-transitory computer-readable medium storing program instructions which, when executed by processing circuitry, perform execution comprising:
    selecting a motion parameter for a current coding block from a plurality of motion parameter candidates, wherein
    the plurality of motion parameter candidates including a set of motion parameters associated with a set of respective image samples not included in a coding tree unit,
    the set of image samples being located at a predetermined position in a first region relative to an extended boundary of the coding tree unit, and
    image samples located in a second region, positioned relative to the first region and the extended boundary of the coding tree unit, are not associated with the set of motion parameters included in the plurality of motion parameter candidates.

* * * * *